(12) United States Patent
Eriksson et al.

(10) Patent No.: US 11,815,618 B2
(45) Date of Patent: Nov. 14, 2023

(54) DOPPLER RADAR COEXISTENCE

(71) Applicant: Topgolf Sweden AB, Danderyd (SE)

(72) Inventors: Jonny Eriksson, Sjövik (SE); Christer Andersson, Gothenburg (SE)

(73) Assignee: Topgolf Sweden AB, Danderyd (SE)

( * ) Notice: Subject to any disclaimer, the term of this patent is extended or adjusted under 35 U.S.C. 154(b) by 0 days.

(21) Appl. No.: 18/168,239

(22) Filed: Feb. 13, 2023

(65) Prior Publication Data
US 2023/0258764 A1 Aug. 17, 2023

(30) Foreign Application Priority Data
Feb. 17, 2022 (SE) .................................. 2230046-1

(51) Int. Cl.
*G01S 7/02* (2006.01)
*G01S 13/58* (2006.01)

(52) U.S. Cl.
CPC ............ *G01S 7/023* (2013.01); *G01S 7/0232* (2021.05); *G01S 7/0235* (2021.05); *G01S 13/584* (2013.01)

(58) Field of Classification Search
CPC .... G01S 13/931; G01S 13/584; G01S 13/343; G01S 13/345; G01S 13/347; G01S 7/0232; G01S 7/0235; G01S 7/0236; G01S 7/023
USPC .................... 342/70, 160, 159, 128, 109, 59
See application file for complete search history.

(56) References Cited

U.S. PATENT DOCUMENTS

| | | | | |
|---|---|---|---|---|
| 6,856,276 B2* | 2/2005 | Barrick | ................. | G01S 13/003 342/195 |
| 7,071,868 B2* | 7/2006 | Woodington | ........ | H01Q 1/3258 342/159 |
| 7,439,903 B2 | 10/2008 | Watanabe et al. | | |
| 9,733,340 B2* | 8/2017 | Rao | ........................ | G01S 13/931 |
| 9,958,527 B2* | 5/2018 | Tuxen | ................. | G01S 13/4454 |

(Continued)

FOREIGN PATENT DOCUMENTS

WO WO 2021003500 1/2021

OTHER PUBLICATIONS

Alland et al., "Interference in Automotive Radar Systems: Characteristics, mitigation techniques, and current and future research," IEEE Signal Processing Magazine, Sep. 1, 2019, 36(5): 45-59.

(Continued)

*Primary Examiner* — Vladimir Magloire
*Assistant Examiner* — Michael W Justice
(74) *Attorney, Agent, or Firm* — Fish & Richardson P.C.

(57) ABSTRACT

Method for providing reduced interference for at least two co-located FMCW (Frequency Modulated Continuous Wave) Doppler radars, each of said radars being used in a system to detect respective distances to and velocities of objects moving through space, can include a propagation determination step, in which expected electromagnetic wave propagation times are determined between pairs of radars; a sweep time offset synchronizing step, in which different respective sweep time offsets are selected, with respect to each radar in a first group of radars; and a sweep frequency offset synchronizing step, in which a second sweep frequency offset is selected with respect to a second group of radars, the second sweep frequency offset being relative to a sweep frequency pattern used for radars belonging to said first group. The invention also relates to a system and to a computer software product.

15 Claims, 15 Drawing Sheets

(56) References Cited

U.S. PATENT DOCUMENTS

| | | | | |
|---|---|---|---|---|
| 10,627,509 | B2* | 4/2020 | Rector | G01S 7/003 |
| 10,782,389 | B2* | 9/2020 | Rao | G01S 13/343 |
| 11,016,169 | B2* | 5/2021 | Vossiek | G01S 7/4021 |
| 11,061,126 | B2* | 7/2021 | Ray | H04L 27/3863 |
| 11,125,854 | B2* | 9/2021 | Ray | G01S 13/825 |
| 11,280,876 | B2* | 3/2022 | Gulati | G01S 7/0232 |
| 11,513,187 | B2* | 11/2022 | Stettiner | G01S 13/931 |
| 11,525,886 | B2* | 12/2022 | Stettiner | G01S 7/0232 |
| 11,609,303 | B2* | 3/2023 | Stettiner | G01S 7/0235 |
| 11,662,427 | B2* | 5/2023 | Wu | G01S 13/343 342/194 |
| 2005/0179582 | A1* | 8/2005 | Woodington | G01S 7/0232 342/128 |
| 2009/0309785 | A1* | 12/2009 | Nalezinski | G01S 7/021 342/200 |
| 2016/0069992 | A1* | 3/2016 | Rector | G01S 13/003 342/59 |
| 2016/0146931 | A1* | 5/2016 | Rao | G01S 13/931 342/59 |
| 2017/0082741 | A1* | 3/2017 | Adib | G01S 13/726 |
| 2017/0363714 | A1* | 12/2017 | Rao | G01S 13/931 |
| 2018/0074192 | A1* | 3/2018 | Rector | G01S 13/87 |
| 2019/0383925 | A1* | 12/2019 | Gulati | G01S 13/345 |
| 2020/0309897 | A1* | 10/2020 | Ray | G01S 13/876 |
| 2020/0309933 | A1* | 10/2020 | Ray | G01S 13/282 |
| 2020/0393553 | A1* | 12/2020 | Kishigami | G01S 7/036 |
| 2021/0003662 | A1 | 1/2021 | Aydogdu et al. | |
| 2021/0156980 | A1* | 5/2021 | Stettiner | G01S 13/584 |
| 2021/0156981 | A1* | 5/2021 | Stettiner | G01S 7/0232 |
| 2021/0156982 | A1* | 5/2021 | Stettiner | G01S 13/931 |
| 2021/0173042 | A1* | 6/2021 | Wu | G01S 13/584 |
| 2021/0173069 | A1* | 6/2021 | Wu | G01S 13/931 |
| 2021/0239792 | A1* | 8/2021 | Rumpler | G01S 7/003 |
| 2021/0389416 | A1* | 12/2021 | Hong | G01S 7/0233 |
| 2021/0396839 | A1* | 12/2021 | Song | G01S 7/021 |
| 2022/0107402 | A1* | 4/2022 | Kishigami | H01Q 21/06 |
| 2022/0137179 | A1* | 5/2022 | Gao | G01S 7/003 342/195 |
| 2022/0141830 | A1* | 5/2022 | Furuichi | H04W 72/0453 370/329 |
| 2022/0187440 | A1* | 6/2022 | Kishigami | G01S 13/288 |
| 2022/0349985 | A1* | 11/2022 | Zhang | G01S 7/006 |
| 2023/0128469 | A1* | 4/2023 | Garrity | G01S 7/35 342/129 |

OTHER PUBLICATIONS

Aydogdu et al., "Radar Interference Mitigation for Automated Driving: Exploring proactive strategies," Autonomous Driving: Part 1, IEEE Signal Processing Magazine, Jun. 26, 2020, 13 pages.

International Search Report and Written Opinion in International Appln. No. PCT/EP2023/053732, dated Mar. 30, 2023, 18 pages.

Khoury et al., "RadarMAC: Mitigating Radar Interference in Self-Driving Cars," 13th Annual IEEE International Conference on Sensing, Communication, and Networking, Jun. 27, 2016, 9 pages.

Office Action in Swedish Appln. No. 2230046-1, dated Sep. 30, 2022, 8 pages.

Final Notice in Swedish Appln. No. 2230046-1, dated Feb. 21, 2023, 86 pages.

* cited by examiner

DOPPLER RADAR COEXISTENCE

BACKGROUND

The present invention relates to a method for providing reduced interference for several colocated Doppler radars. In particular, the Doppler radars in question may be FMCW (Frequency Modulated Continuous Wave) radars, such as provided for automatically tracking trajectories of moving objects, for instance sporting projectiles, such as golf balls. The invention also relates to a system for performing such a method and to a computer software product arranged to perform such a method.

It is known to use FMCW Doppler radars to automatically track such objects as they move through space in relation to the radar in question. Using an FMCW Doppler radar, it is possible to measure both a distance (sometimes denoted "range" in the art) to the moving object in question as well as a (radial) velocity of the moving object in question in relation to the radar. Normally, such radars are also capable of measuring a direction to the object in question, in relation to the tracking radar.

SUMMARY

Many times, several FMCW Doppler radars are distributed over an area to monitor a defined space. In order to achieve this, such FMCW Doppler radars may be required in one and close locations, in other words collaborating to monitor a connected space for tracked objects. This may, for instance, be the case at a golf driving range. In such cases, there is a problem of interference between such co-located FMCW Doppler radars. In other words, electromagnetic waves emitted from one such radar will be received, directly or via reflections, by one or several other co-located radars. There is then a risk that such received signals are mistakenly interpreted as originating from tracked objects or lead to other interference. For instance, interference may degrade the sensitivity so that important weak target signals of interest cannot be detected.

Known ways of solving interference problems of radar equipment include time and frequency multiplexing. However, time multiplexing generally decreases measurement granularity and precision, and an available frequency bandwidth is often limited. In particular, it is often preferred to be able to use a set of relatively simple, identical radar devices, for instance at a golf driving range.

U.S. Pat. No. 6,856,276 B2, relating to marine wave monitoring, describes an FMCW radar system using several coexisting radars wherein interference problems are addressed by introducing a relative time delay for chirps (frequency sweeps) emitted by individual radars.

The present invention can solve one or more, or all, of the above described problems.

Hence, the invention relates to a method for providing reduced interference for at least two colocated FMCW (Frequency Modulated Continuous Wave) Doppler radars, each of the FMCW Doppler radars being used in a system to detect respective distances to and velocities of objects moving through space in relation to the respective FMCW Doppler radar, the method comprising determining expected electromagnetic wave propagation times between pairs of the FMCW Doppler radars; selecting different respective sweep time offsets with respect to each FMCW Doppler radar in a first group of the FMCW Doppler radars; and selecting a second non-zero sweep frequency offset with respect to a second group of the FMCW Doppler radars, the second sweep frequency offset being relative to a sweep frequency pattern used for FMCW Doppler radars belonging to the first group.

In some embodiments, the method further comprises the system using several of the FMCW Doppler radars to measure a respective location and velocity, relative to a respective measuring FMCW radar, of one or several moving objects, by each of the FMCW Doppler radars repeatedly emitting FMCW sweeps using the selected respective sweep time offset and, in applicable cases, the selected respective sweep frequency offset.

In some embodiments, the FMCW sweeps comprise respective return ramp waveforms, and the return ramp waveforms are blanked.

In some embodiments, the method further comprises repeating the determining of expected electromagnetic wave propagation times; the selecting of different respective sweep time offsets; and the selecting of a second non-zero sweep frequency offset, the repeating being performed periodically and/or when adding an additional FMCW Doppler radar to the system.

In some embodiments, the method further comprises synchronizing a respective clock of each of the FMCW Doppler radars, such as based on a common received geolocation signal or a common received time signal from a central control module of the system, the clock then being used in combination with the respective sweep time offset to trigger an FMCW sweep.

In some embodiments, the determining of expected electromagnetic wave propagation times comprises one or several of the FMCW Doppler radars emitting a respective electromagnetic test signal, the electromagnetic test signal being detected and timed by one or several of the other FMCW Doppler radars.

In some embodiments, the determining of expected electromagnetic wave propagation times comprises each FMCW Doppler radar receiving the electromagnetic test signal and determining a maximum detected propagation time of the electromagnetic test signal, taking into consideration any multi-path wave trajectories, the received electromagnetic test signal having at least a predetermined minimum power at reception.

In some embodiments, the electromagnetic test signal is an FMCW wave.

In some embodiments, the electromagnetic test signal is emitted from each emitting FMCW Doppler radar having a carrier frequency that is offset in relation to a carrier frequency used for respective electromagnetic test signals by each of the other FMCW Doppler radars.

In some embodiments, the determining of expected electromagnetic wave propagation times comprises measuring, at each FMCW Doppler radar receiving the electromagnetic test signal, a maximum power of the received electromagnetic test signal.

In some embodiments, a respective sweep waveshape used by each of the FMCW Doppler radars is identical across the FMCW Doppler radars, apart from the respective sweep time offset and sweep frequency offset used by the FMCW Doppler radar.

In some embodiments, the selecting of different respective sweep time offsets comprises in a first ranking, ranking FMCW Doppler radars in a first ranking group of FMCW Doppler radars, the first ranking being performed according to interference severity in relation to the other FMCW Doppler radars of the first ranking group, the first ranking further being based on the expected electromagnetic wave propagation times; and for each of the FMCW Doppler radars in the first ranking group, in order from a most severely interfering one of the FMCW Doppler radars to less severely interfering ones of the FMCW Doppler radars, selecting a respective first sweep time offset for the FMCW Doppler radar, taking into consideration both a determined minimum relative sweep time offset and a propagation time delay of the FMCW Doppler radar in relation to other FMCW Doppler radars in the first ranking group for which a respective first sweep time offset has already been selected.

In some embodiments, the selecting of different respective sweep time offsets further comprises identifying a second ranking group of one or several FMCW Doppler radars in the first ranking group for which it is determined that it is not possible to select a respective sweep time offset that does not result in a predetermined minimum level of interference during object tracking operation; in a second ranking, ranking FMCW Doppler radars in the second ranking group of FMCW Doppler radars, the second ranking being performed according to interference severity in relation to the other FMCW Doppler radars of the second ranking group, the second ranking further being based on the expected electromagnetic wave propagation times; for each of the FMCW Doppler radars in the second ranking group, in order from a most severely interfering one of the FMCW Doppler radars to less severely interfering ones of the FMCW Doppler radars, selecting a respective second sweep time offset for the FMCW Doppler radar, taking into consideration both the determined minimum relative sweep time offset and a propagation time delay of the FMCW Doppler radar in relation to other FMCW Doppler radars in the second ranking group for which a respective second sweep time offset has already been selected; selecting as the first group of FMCW Doppler radars the FMCW Doppler radars belonging to the first ranking group but not to the second ranking group; and selecting as the second group of FMCW Doppler radars one or several FMCW Doppler radars belonging to the second ranking group.

In some embodiments, the selecting of different respective sweep time offsets further comprises determining the minimum relative sweep time offset based on a minimum sweep time offset producing at least a predetermined attenuation of an IF (Intermediate Frequency) of one of the FMCW Doppler radars experiencing interference from another one of the FMCW Doppler radars.

In some embodiments, the sweep frequency offset is selected so that interference between FMCW Doppler radars belonging to the first group and FMCW Doppler radars belonging to the second group result in object velocity misreads that are outside of a predetermined velocity range, such misreads corresponding to false object detection due to the interference.

In some embodiments, the sweep frequency offset is selected as between 0.3 and 0.7 times a sweep repetition frequency used by the FMCW Doppler radars.

Furthermore, the invention relates to a system for detecting respective distances to and velocities of objects moving through space in relation to at least one of at least two co-located FMCW (Frequency Modulated Continuous Wave) Doppler radars, the system comprising the FMCW Doppler radars; one or more hardware processors, the hardware processors being configured to determine expected electromagnetic wave propagation times between pairs of the FMCW Doppler radars; select different respective sweep time offsets with respect to each FMCW Doppler radar in a first group of the FMCW Doppler radars; and select a second non-zero sweep frequency offset with respect to a second group of the FMCW Doppler radars, the second sweep frequency offset being relative to a sweep frequency pattern used for FMCW Doppler radars belonging to the first group.

In some embodiments, one or more of the one or more hardware processors are located in one or more of the FMCW Doppler radars.

In some embodiments, the system comprises a central control module, and one or more of the one or more hardware processors are located in the central control module.

Moreover, the invention relates to a computer software product arranged to, when executing on computer hardware of a central control module and/or a set of distributed FMCW Doppler radar devices, detect respective distances to and velocities of objects moving through space in relation to at least one of at least two co-located FMCW (Frequency Modulated Continuous Wave) Doppler radars, the computer software product comprising a control function in turn being arranged to provide reduced interference for each of the FMCW Doppler radars by determining expected electromagnetic wave propagation times between pairs of the FMCW Doppler radars; selecting different respective sweep time offsets with respect to each FMCW Doppler radar in a first group of the FMCW Doppler radars; and selecting a second non-zero sweep frequency offset with respect to a second group of the FMCW Doppler radars, the second sweep frequency offset being relative to a sweep frequency pattern used for FMCW Doppler radars belonging to the first group.

The computer software product may be implemented by a non-transitory computer-readable medium encoding instructions that cause one or more hardware processors located in at least one of the FMCW Doppler radars in the system and/or in a central control module of the system to perform the determining of expected electromagnetic wave propagation times, the selecting of different respective sweep time offsets and the selecting of a second non-zero sweep frequency offset.

BRIEF DESCRIPTION OF THE DRAWINGS

In the following, the invention will be described in detail, with reference to exemplifying embodiments of the invention and to the enclosed drawings, wherein.

DETAILED DESCRIPTION

The present invention broadly relates to interference mitigation within a group of FMCW (Frequency Modulated Continuous Wave) radar devices 120 operating at the same RF (Radio Frequency) band. The FMCW radar devices 120 may be coordinated, either by a central control module 110 or in a decentralized manner utilizing a suitable set of rules specifying device-specific behavior, and possibly also inter-device interactions with respect to synchronization of actions and information. In order to work together in a coordinated manner, these cooperative radar devices 120 need to have a good sense of a global time reference, such as derived from the central control module 110 and/or a geolocation signal, such as a GPS (Global Positioning System) receiver of each radar device 120.

Further generally, the present invention relates to Doppler radar technology, in other words the FMCW radar devices 120 are Doppler radar devices. In the following, the expression "FMCW Doppler radar" will be used.

The FMCW radar devices 120 may be FMCW Doppler radars of "linear" type, in other words operating using linear FMCW. Examples of such linear FMCW include the below-described "sawtooth", "inverted sawtooth" and "triangular" frequency/time shapes, wherein frequency varies with time in a linear fashion. It is, however, understood, that non-linear frequency variations may also be used in some embodiments.

In the conventional case, an FMCW radar transmits a continuous waveform with a linear frequency modulation, even if various types of non-linear frequency modulations are also possible. For reasons of simplicity, in the following description it is assumed that the modulation is of a "sawtooth" type, as is illustrated in FIG. 1a.

Figure 1A:
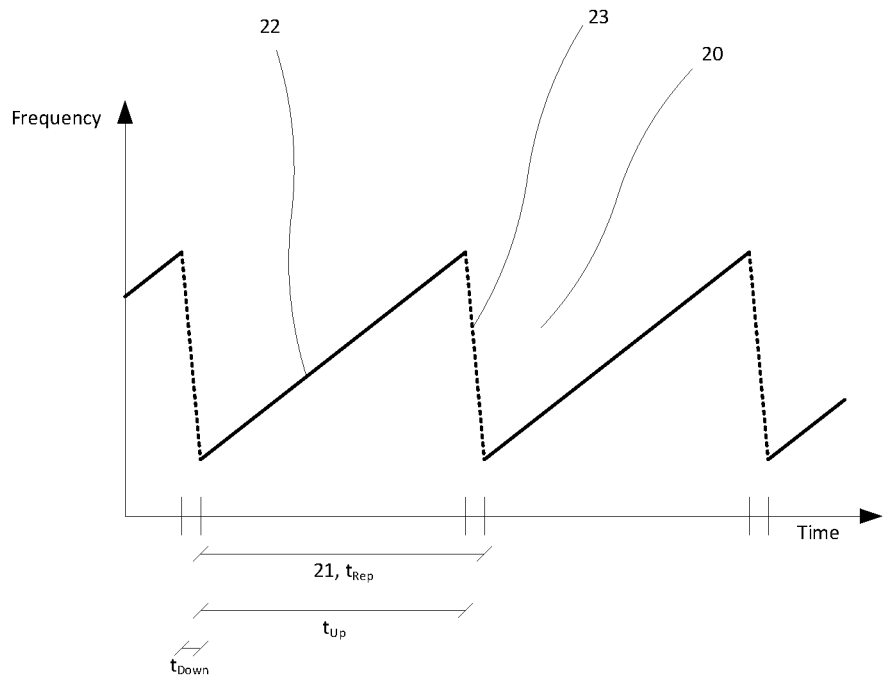
FIGS. 1a-1c are respective simplified charts each showing a frequency sweep or chirp.

Hence, in FIG. 1a an FMCW waveform 20 of "sawtooth" (or, using a different terminology, "sawtooth up") type is illustrated. Reference numeral 21 denotes a frequency sweep time (corresponding to the sweep repetition interval, $T_{Rep}$), that may in general be constant over time and the same for all FMCW Doppler radars 120. Reference numeral 22 denotes an "up-chirp" part (the actual frequency sweep) whereas 23 denotes (using broken lines) a "down-chirp" part during which the frequency is returned to its starting value for another frequency sweep.

Figure 1B:
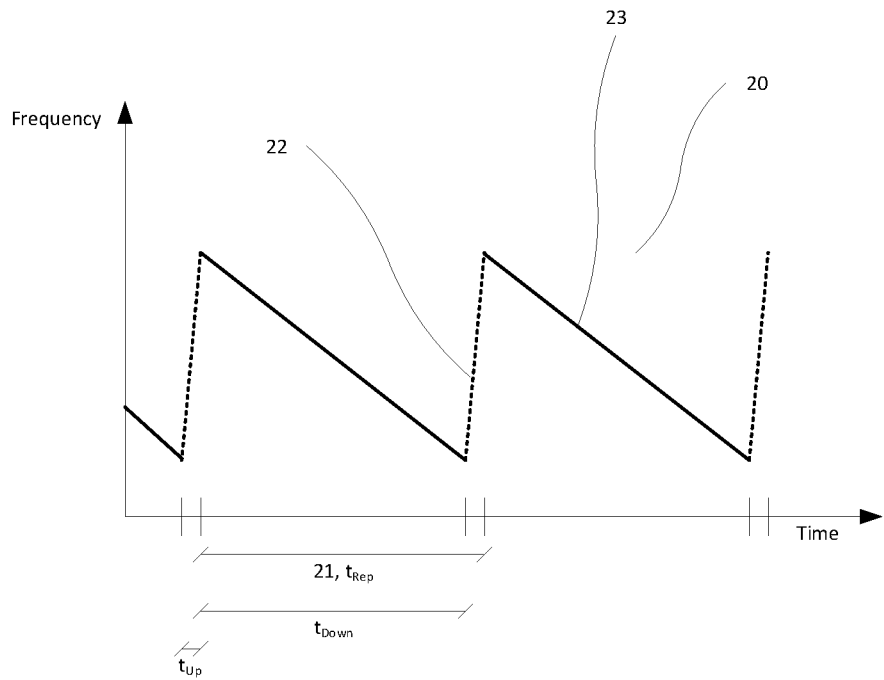
Figure 1C:
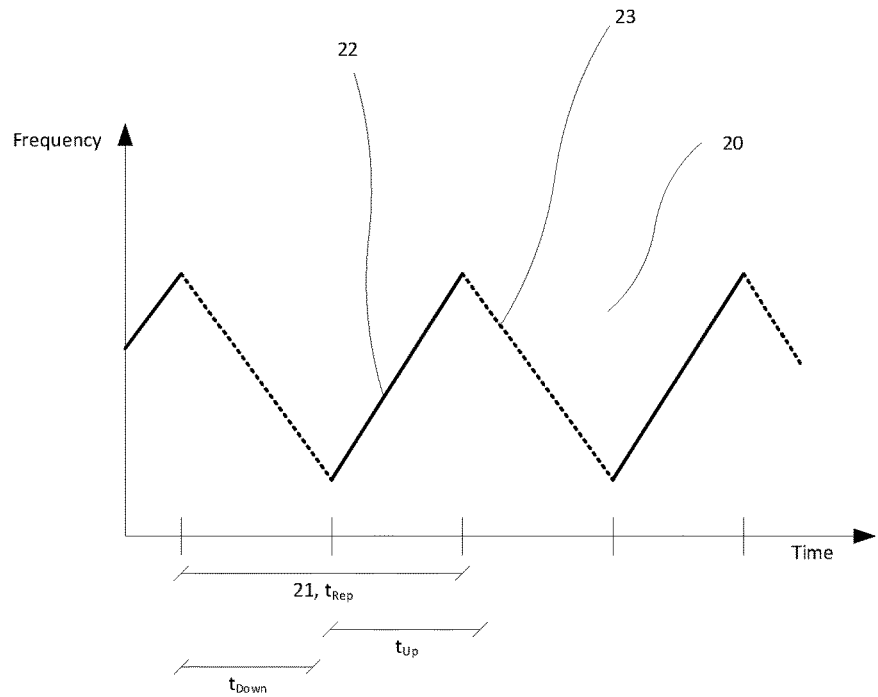

It is realized that other time-repeating FMCW waveforms than such a "sawtooth" type are useful in the present context, and that the "sawtooth" type is merely an example provided for reasons of clarity. Preferably, in useful FMCW waveforms in the present context, the frequency varies linearly with time. FIGS. 1b and 1c disclose two examples of different FMCW waveforms useful in the present context.

In some embodiments, however, the FMCW waveforms used are one or several of "sawtooth up", "sawtooth down" or "triangular" as described herein and illustrated in FIGS. 1a-1c.

Hence, FIG. 1b shows a "sawtooth down" variant, whereas FIG. 1c show a "triangular" variant. In the latter, the up-sweeps and the down-sweeps sweep are nominally of the same duration and the chirp rate of the down-sweeps is the negative of the chirp rate of the up-sweeps. Note that FIGS. 1a-1c share the same reference numerals for corresponding parts.

The range and Doppler processing when using the triangular waveform is a bit different than for a sawtooth type waveform (not going into details about that here). A note is however that the down-sweeps are as important as the up-sweeps in this case (the down-sweeps in the sawtooth types are not contributing to range (or Doppler) determination). Hence, in the case of FIG. 1a one "tooth" (up-ramp) of the waveform is often referred to as a "chirp" or a "sweep" and the rise portion has a particular time duration $t_{Up}$. The chirp rate $\mu$ is defined as the change of frequency per unit time during the up-chirp. In an FMCW radar using linear frequency modulation, the chirp rate is constant (the slope). In-between chirps, the radar must go back to the starting frequency, hence the "down-chirp". Ideally, the transition time going back to the staring frequency is zero, but that is generally not possible. However, for the saw tooth waveform, the downwards transition time duration $t_{Down}$ is usually only a small fraction of $t_{Up}$.

Figure 2:
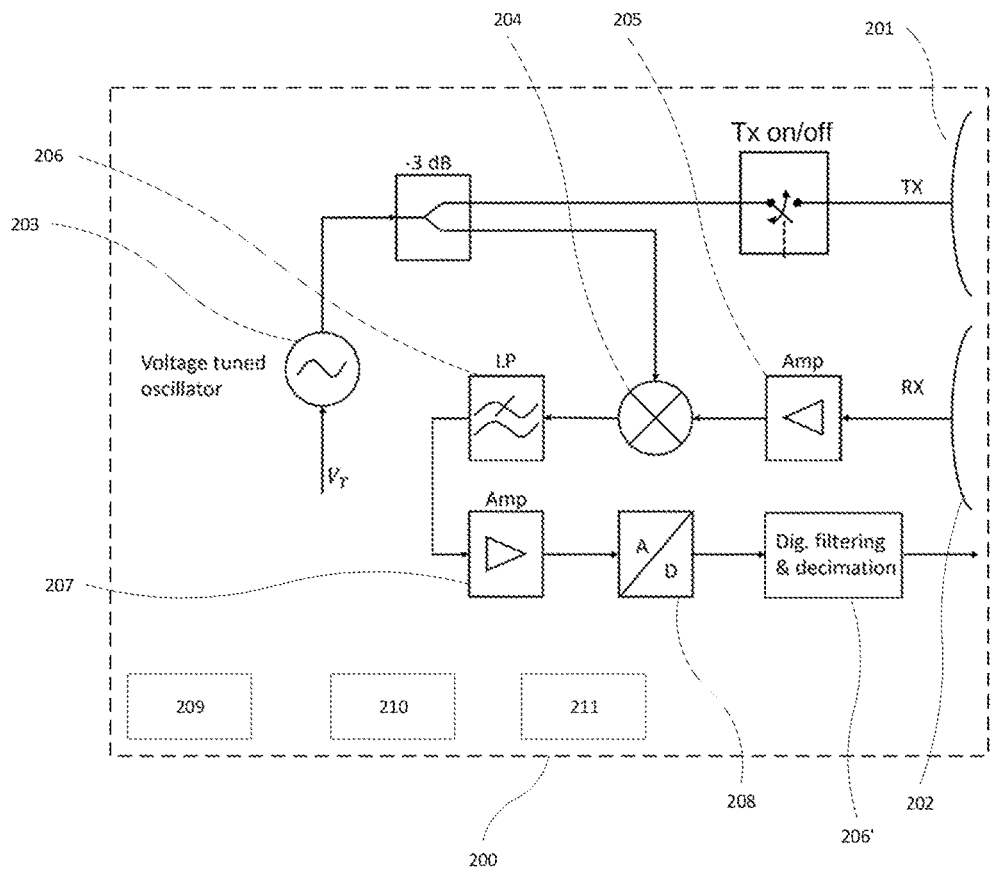
FIG. 2 is an overview diagram of an FMCW Doppler radar.

A block diagram of a typical FMCW Doppler radar 200 is shown in FIG. 2.

The FMCW Doppler radar 200 comprises a transmit antenna 201, a receive antenna 202 and an oscillator 203 used to produce the waveform 20 in question. A waveform signal is hence provided from (or based on) the oscillator 203 to the transmit antenna 201, and is also provided to a mixer 204. The receive antenna 202 provides a delayed version (due to a target echo) of the transmitted waveform signal. The received signal may be amplified by a low noise amplifier 205 and provided to the mixer 204. The mixer 204 demodulates the received signal by multiplying it with the reference waveform signal, the result being a constant frequency signal with a frequency proportional to the time delay of the target echo. This signal is provided to and low-pass filtered by a filter module 206. The filter module 206 provides the mixed, filtered signal to A/D converter 208, possibly after amplification in another amplifier 207. Downstream of the A/D converter 208, there is a digital filter module 206', arranged to perform any filtering, decimation and similar, as is well-known per se for FMCW Doppler radars 200 of the present general type.

The resulting signal is provided to a local control logic 209 for digital processing. It is preferred that the receiver bandwidths of all participating FMCW Doppler radars 120 in the system 100 are the same, or at least differ by no more than 50%.

The FMCW Doppler radar 200 also comprises a time synchronizing means 210, such as comprising a receive antenna for a global time reference signal, such as a geolocation signal, for instance a GPS signal. Alternatively, the time synchronizing means 210 may be arranged to receive a time synchronizing signal, broadcast from a central control module 110 (see below). The time synchronizing means 210 may form a part of the local control logic 209. For instance, the local control logic 209 can include a clock that is synchronized to the respective clocks of peer FMCW Doppler radars 200.

Clock synchronization across FMCW Doppler radars 120 may be performed regularly, such as at least once every 10 s, or even at least once every 5 s, for instance once every second.

The FMCW Doppler radar 200 also comprises communication means 211, such as wireless or wired communication means, arranged to allow the FMCW Doppler radar 200 to digitally communicate with peer FMCW Doppler radars of corresponding type and/or with said central control module 110. Possible communication channels include WiFi or any other radio communication standard; and a wired communication channel. For instance, a per se conventional internet communication protocol may be used for said communications.

The FMCW waveform 20 is transmitted by the transmit antenna 201 and reflected off a target object 10 (see below) back towards the receive antenna 202. At reception, the (weak) received signal is multiplied together by a copy of the transmitted signal. The round trip delay will generate a constant frequency signal at the output of the mixer 204 with a frequency that is proportional to the round trip delay, in turn being proportional to the distance (range) to the target object 10. The signal after the mixer 204 is known as the IF (Intermediate Frequency) signal, and is sometimes also referred to as a "beat signal".

Since the output signal at the mixer 204 is a sinusoid, with a frequency proportional to the range (or more precisely, to the relative delay), the range can be extracted by performing a Fourier transform of the received signal. For instance, a per se conventional fast Fourier algorithm can be used. Furthermore, since superposition applies, a group of target objects 10 can be resolved with respect to distance, as long as they have different radial distances in relation to the radar 220 in question, since they will then be associated with different IF frequencies.

Figure 3:
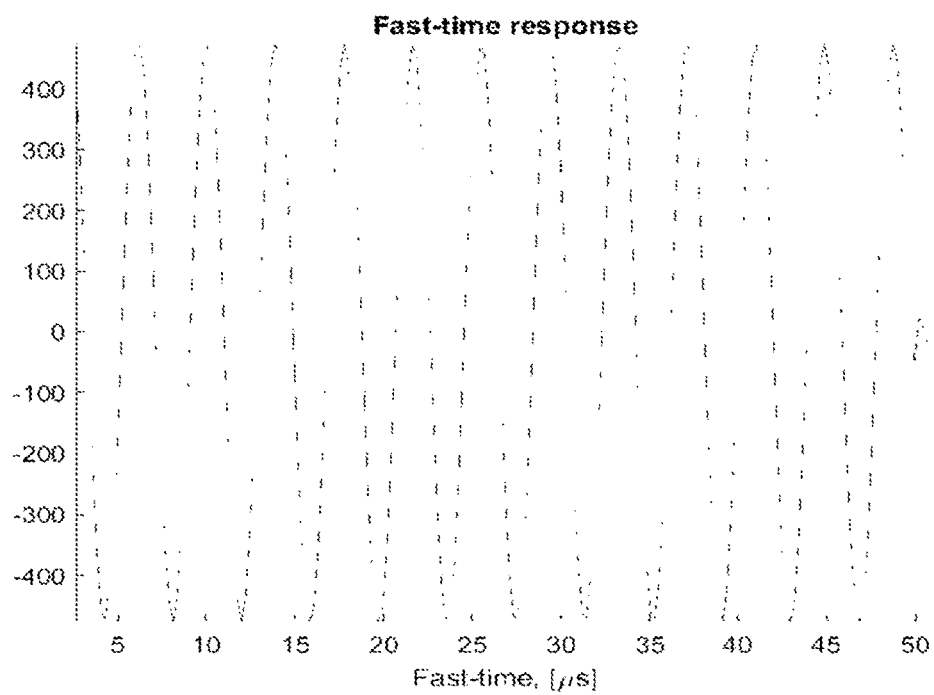
FIG. 3 is a chart showing a signal after mixing for a target radar.

FIG. 3 shows the real part of the complex base band signal after mixing and filtering. The target object in this example is located at 49.8 meter range.

Figure 4:
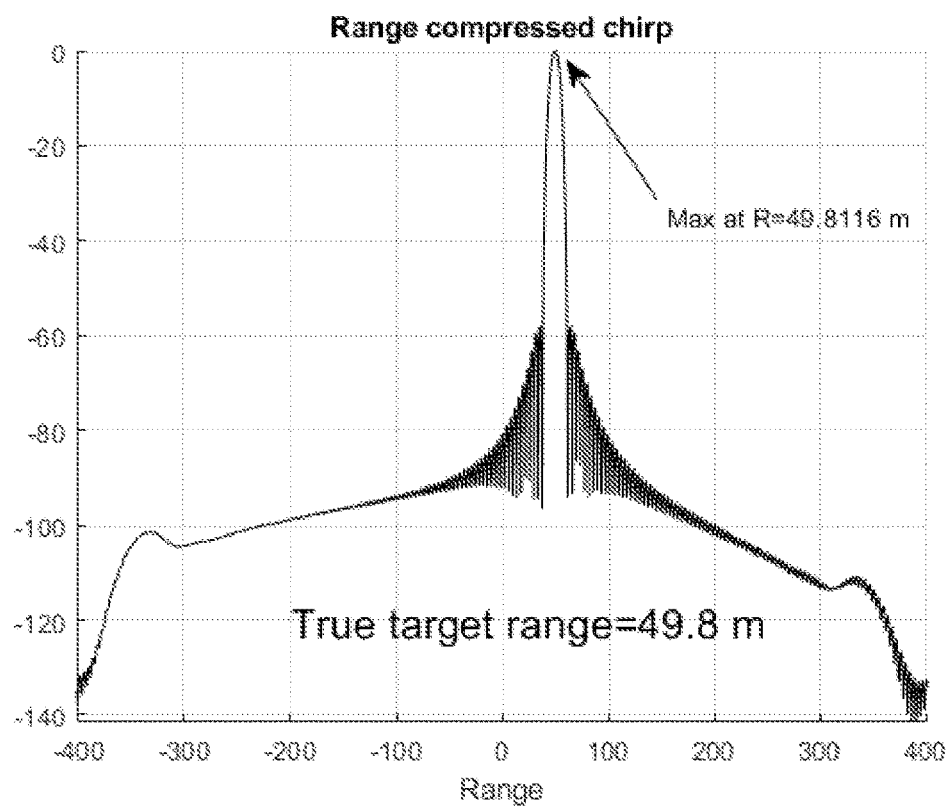
FIG. 4 is a chart showing a range-compressed signal via a Fourier transform.

After Fourier-transforming the received signal, a focused response is received at the target range, see FIG. 4.

Next, some theoretical aspects will be explained in relation to the range-Doppler (i.e., target object 10 distance-velocity) processing performed in the present system for target object 10 detection. These details may help to understand the relation between IF frequency and the peak location in the range-velocity space.

A sequence of sweeps (chirps) is considered and the receiver response for a single chirp is referred to as "fast time". The received data may be arranged in a matrix, for example row 1 could be the sampled response for sweep 1, row 2 the sampled response for sweep 2 and so on. Hence, "fast time" would be along columns (for a particular row). The row-dimension, on the other hand, is often referred to as "slow time", since, e.g., for a column, the time increment from one row to another is equal to the sweep repetition interval, $T_{Rep}$.

As mentioned above, the range profile is obtained by applying a Fourier transform along the fast time dimension (along columns, for each row, in said matrix). When Fourier transforming each received sweep, there will be a peak at the IF frequency $\tilde{f}$. In the general case, $\tilde{f}$ will also be affected by the Doppler shift of the target object 10, resulting in some bias of the range estimate that can be compensated for in the processing. This effect is ignored for the time being.

The mapping between IF frequency and range is $R_m = c\tilde{f}/(2\mu)$, where c is the speed of light and $\mu$ is the chirp rate. The samples after range compression (fast time Fourier transform) are referred to as "range bins".

In the radar processing, the assumption when mapping IF frequencies to equivalent range is that the signal has undergone a two-way propagation, and that the return is due to the own transmitted signal reflecting off a target object 10 (for the same carrier frequency). If instead the response due to an interfering FMCW radar device having a matched waveform (see below) is considered, at a range of say 50 meters, it will generate a peak at half that range, in other words at 25 meters.

The term "matched waveform" refers to that the interfering FMCW radar device has a waveform which is identical to the victim radar (the radar being interfered), with same time offset and same carrier frequency.

When a Fourier transform is applied over the row dimension of said matrix, there will be a peak at the frequency $$\check{f}_D = \mathrm{mod}\left(f_D, \frac{1}{T_{Rep}}\right) = \mathrm{mod}(f_D, PRF),$$

since $T_{Rep}$ is the sampling interval in slow time. The modulo operation accounts for possible folding with respect to the sampling rate in the slow-time dimension, which is $$\frac{1}{T_{Rep}}.$$

Here the concept of "Pulse Repetition Frequency" (PRF) is also introduced, which is widely used within the art (a "sweep" or "chirp" is a "pulse").

The relation assumed (for moving target objects 10) in radar signal processing between Doppler frequency and radial velocity (v=Ṙ) is $f_D = -2v/\lambda$, where $\lambda$ is the wavelength, so the velocity of the observed target object 10 is estimated from the Doppler frequency estimate $f_D$ as $$v = -\frac{\lambda}{2} f_D \tag{1}$$

Furthermore, defining $$v_{PRF} = -\frac{\lambda}{2} PRF$$

as the unambiguous velocity interval (corresponding to $\check{f}_D$), the following expression results for where the folded velocity peak ends up in the velocity domain:

$$\check{v} = \mathrm{mod}(v, v_{PRF}) \tag{2}$$

In the equations above, the unambiguous Doppler and velocity intervals are [0, $1/T_{Rep}$] Hz and [0, $v_{PRF}$] m/s. Usually, the symmetric intervals [$-0.5/T_{Rep}$, $0.5/T_{Rep}$] Hz and [$-0.5v_{PRF}$, $0.5v_{PRF}$] m/s are considered.

To illustrate the theoretical background of the present principles, some general characteristics of FMCW interference will now be discussed. In general, the interference characteristics depend on the waveform parameters of the interfering radar and the victim radar.

First the case in which the waveforms of the interfering radar and the victim radar are matched is analyzed, in other words that the frequency sweeping has the same shape characteristics for both radars. Furthermore, for simplicity it is assumed an idealized situation when the interfering and victim radars generate perfect chirps that are in sync with each other. In this case, an interfering radar will generate a response similar to a point target in the victim radar, see FIG. 5.

Figure 5:
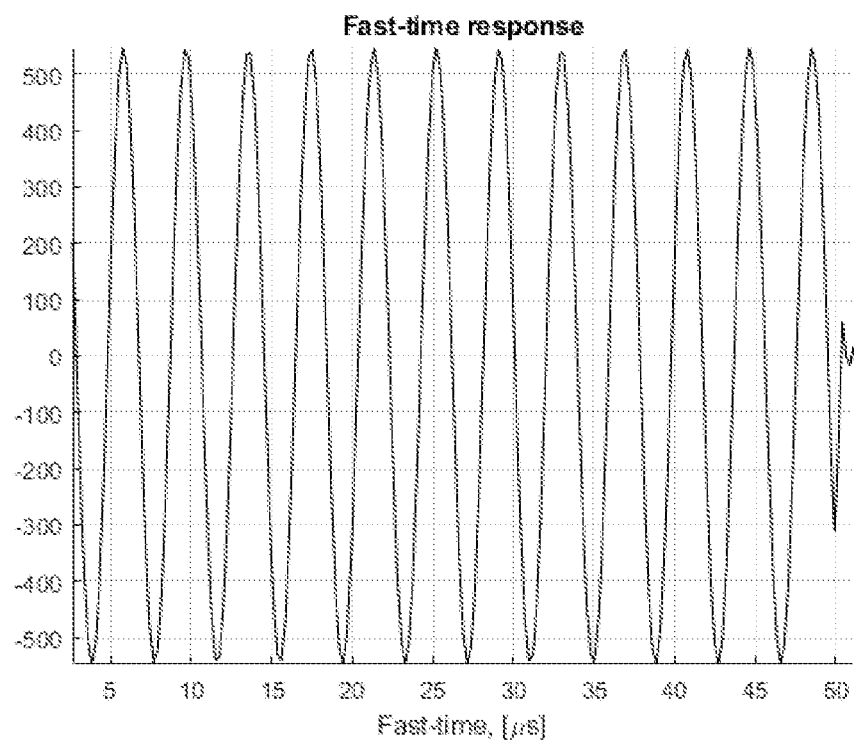
FIG. 5 is a chart (upper part) showing the response at the output of a victim radar receiver due to an interfering radar with matching waveform; a corresponding range-sweep matrix (middle part); and a corresponding range-velocity matrix (lower part)
Figure 5:
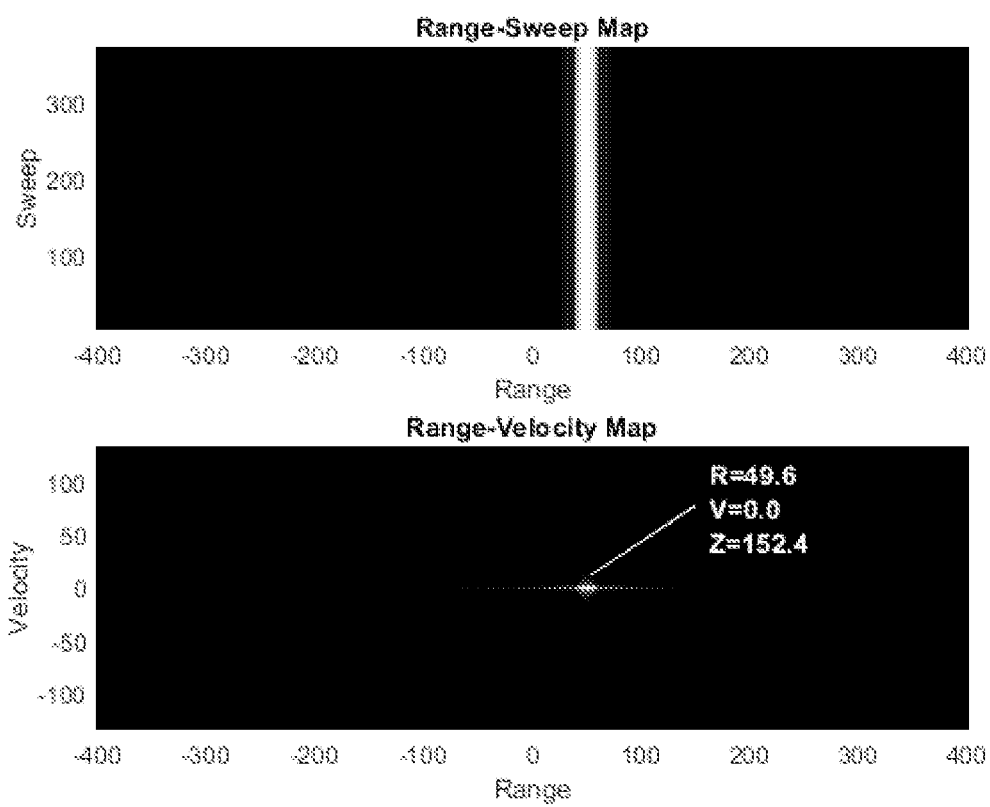

The upper part of FIG. 5 illustrates the response at the output of the victim radar receiver due to an interfering radar at a range of 99.2 m from the victim radar in boresight direction, emitting a waveform which is matched to the victim waveform. A strong peak response is seen at half this range, at 49.6 m and zero target object velocity.

The middle part of FIG. 5 illustrates a corresponding "range-sweep" matrix (range Fourier transform is performed, but no velocity Fourier transform performed). The lower part of FIG. illustrates a corresponding "range-velocity" matrix, showing a compressed point-like response at zero velocity and half the range to the interferer (one-way propagation for interferers).

Figure 6:
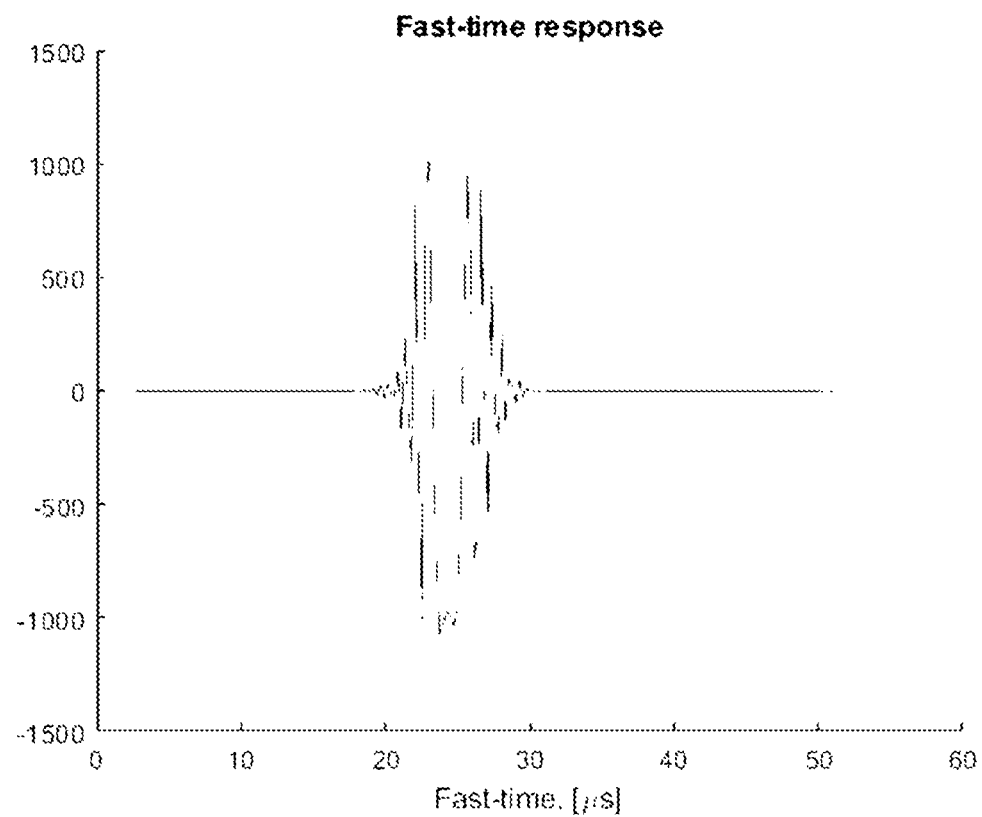
FIG. 6 corresponds to FIG. 5, but shows a case with non-matching waveform between radars.
Figure 6:
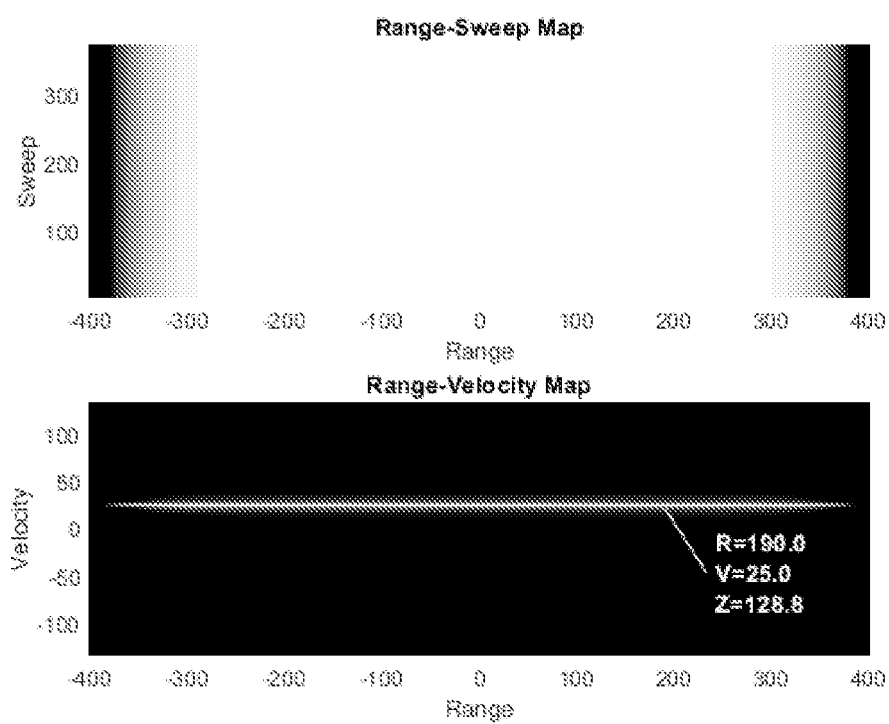

Turning now instead to the case with unmatched waveforms, in other words when waveform parameters of the interfering radar devices differ, the interference is smeared to various degree depending on how different the waveforms are. The example illustrated in FIG. 6 shows resulting interference when the victim radar uses a 37.6 MHz waveform and the interfering radar instead uses a 9.7 MHz waveform. The nominal carrier frequencies of the two radars are the same as are the nominal chirp repetition frequencies and the lengths of the (up) chirps; so the chirp rates is the main differing parameter. The geometry of the problem (and all other relevant system parameters, output powers, antennas etc.) are the same as in the example shown in FIG. 5. However, in addition to changing to an unmatched waveform, a clock drift (oscillator drift) has also been added of 7 ppm to the interferer (the clock of the interferer runs faster than for the victim, 7 microseconds per second). The unsynchronized oscillators and independent drift cause a varying degree of smearing of the interference response, in addition to the smearing due to mismatched nominal waveform parameters.

Hence, the upper part of FIG. 6 shows the response at the output of the victim radar receiver due to the interfering radar with a waveform not matched to the victim waveform. As is clear from this upper part of FIG. 6, there is a resulting "mini-chirp" with a nominal chirp rate equal to the difference of the chirp rates of the victim and the interferer. The duration of the mini-chirp depends on the chirp rate of the mini-chirp and the bandwidth of the receiver chain of the victim radar.

The middle part of FIG. 6 shows the "range-sweep" matrix (range Fourier transform done, but no velocity Fourier transform done), corresponding to the middle part of FIG. 5, above. The lower part of FIG. 6 instead shows the "range-velocity" matrix (corresponding to the lower part of FIG. 5, above), based on a 20 ms coherent processing time interval, wherein it is clear that the response to the interfering FMCW signal is smeared, the main reason being the unmatched waveforms.

Hence, from the lower part of FIG. 6, it can be seen that a smeared interference is present; the interference is located along a ridge in the range dimension. Due to the relative drifts of the oscillators, the location of the ridge has moved away from zero velocity. Although the nominal carrier frequencies are the same, the drift causes an effective carrier frequency difference, the size of which determines the location of the ridge in the velocity dimension (drift is modelled as constant during the 20 ms coherent processing interval).

As mentioned above, the present solution is particularly useful when time and/or frequency multiplexing is either not possible or desired. Hence, it is generally preferred that the present method and system does not employ such multiplexing, in other words that all FMCW Doppler radars 100 of the present system 100 shall coexist and transmit simultaneously in time and within the same frequency (sub)band. In some embodiments, however, the present synchronization methods can be employed in connection to a certain multiplexing, the multiplexing itself then not being sufficient to adequately suppress or avoid occurring interference.

Instead of a multiplexing approach, FMCW Doppler radars 120 of the system 100 generally use the same nominal waveforms and parameters except the below-described time offset parameter and slightly offset carrier frequencies.

As was explained above, non-cooperative (uncoordinated) FMCW Doppler radars generate inter-radar interference that is smeared out in the range-velocity domain to various degrees depending on how dissimilar the waveforms are. In present applications, such as in golf ball tracking, it is desired to keep a high sensitivity of weak target signals and high requirements on the accuracy of the estimates of the parameters of these signals. Furthermore, in many concrete applications the interference may be quite strong between FMCW Doppler radars 120; the Interference to noise ratio can often be as high as 50 to 60 dB before any coherent integration. So, a smearing of such strong interference is undesirable since effectively the sensitivity will be set down over large regions in the range-velocity domain.

At the same time, there may be regions in the range-velocity domain where the requirements are less severe. For example, there can be a maximum velocity above which no target objects are expected to be detected.

Hence, using a set of FMCW Doppler radars with "unmatched" waveforms will result in a significant reduction of system performance in terms of sensitivity and estimation accuracy, the reasons being that the interference is usually extremely strong and widely spread; and there will be no control over where interference will be located in the range-velocity domain.

Instead, the approach used herein is to coordinate the FMCW Doppler radars 120 in such a way that the interference is focused at beneficial regions in the range-velocity space where sensitivity to interference is relatively low. Furthermore, it is desirable to prevent that the interference energy in such regions "leaks out" into regions associated with high requirements on sensitivity and parameter estimate accuracy. As will be explained below, the latter can be accomplished by carefully selecting of the windows to be used in the processing (constituting a compromise between resolution and sidelobe levels) and possibly also considering using some Tx-blanking/Tapering of the transmitted chirps to reduce the effects of the short portions of the chirp repetition intervals that correspond to the down-chirps.

As will also be described below, one important means for mitigation of mutual interference within the set of cooperating FMCW Doppler radars 120 is to schedule the start of the individual chirps of the radars 120 in question such that they have a time delay relative each other. If the sets of delays are chosen properly, and the nominal waveform parameters are otherwise the same, the delay imposed on purpose will cause the IF frequencies of the other FMCW Doppler radars, at a victim radar, to be outside the receiver bandwidth (i.e., at "ranges" that are not searched for target objects 10) of the victim radar. As a result, the interference will be greatly attenuated.

As will be discussed below, the number of FMCW Doppler radars 120 that are to coexist may often be larger than what is possible to accommodate by just delaying the sweeps. In such a case, the present inventors have developed a manner of solving this problem, using sub-groups: time offsets are chosen such that systems within such a sub-group can operate without mutual interference, but so that there will be interference between sub-groups.

The filter chain (i.e., the combination of the analog filter 206 and the digital filtering steps in 206') of each FMCW Doppler radar 120 in the system 100 should have as sharp transition bands as possible (beyond the maximum IF range, i.e., maximum range for target detection) and as high out-of-band attenuation as possible. This will increase the number of FMCW Doppler radars 120 that can coexist since one can choose a denser set of time offsets and still meet the interference rejection requirements.

Hence, by introducing deliberate relative chirp delays between the systems it is possible to locate the interference outside the interesting range interval.

However, in the general case, N groups can be defined. These groups can be defined during the determination of time-offsets of the sweep delays, for instance in the manner exemplified below using a "first" group 121, and "second" 122 and possible further groups. Each group will then be given their own set of time-offsets that are overlapping (i.e., in a similar span) with the time offsets of the other groups. The time-offsets given to FMCW Doppler radars 120 in a group will guarantee interference-free operation amongst radars 120 in that group. But, as described above, there may be significant inter-group interference.

To reduce the implications of sub-group interference it is possible to change the center frequencies of the sweeps of the FMCW Doppler radars 120 in one sub-group in relation to all other subgroups, so that the interference that this group of radars 120 inflict on the other groups of FMCW Doppler radars 120 ends up at velocities that are not important for target detection and estimation in the other groups of radars. Specifically, all sub-groups may be given a uniquely (same for all FMCW Doppler radars 120 within a sub-group) adjusted center frequency in order to reduce the effect of inter-group interference.

So, small differences in the center frequencies between groups 121, 122 (carrier frequency differences) may be selected to accomplish a separation of groups 121, 122 in the velocity domain to reduce the effect of mutual interference between the groups 121, 122 of FMCW Doppler radars 120.

This accomplishes a "separation of sub-groups", as is detailed below.

As in the case of the receiving filter chains 206, 206' (filtering in the IF dimension), velocity filtering (Doppler filtering) can also be applied to reduce sidelobe levels in the velocity domain that spread out from the located interference response; the sidelobes of which are dictated by the processing window used. The Doppler filtering then runs continuously along the slow-time dimension, enabling the use of very long filters with high stopband attenuation. This filtering may be a bandpass filtering.

As used herein, by the "filter chain" 206, 206' of a receiving FMCW Doppler radar 120 is meant the total transfer function from the output terminal of the receiving antenna 201 to the final output of the radar, such as prior to performing the two-dimensional Fourier transform to produce the range-velocity matrix.

Figure 7:
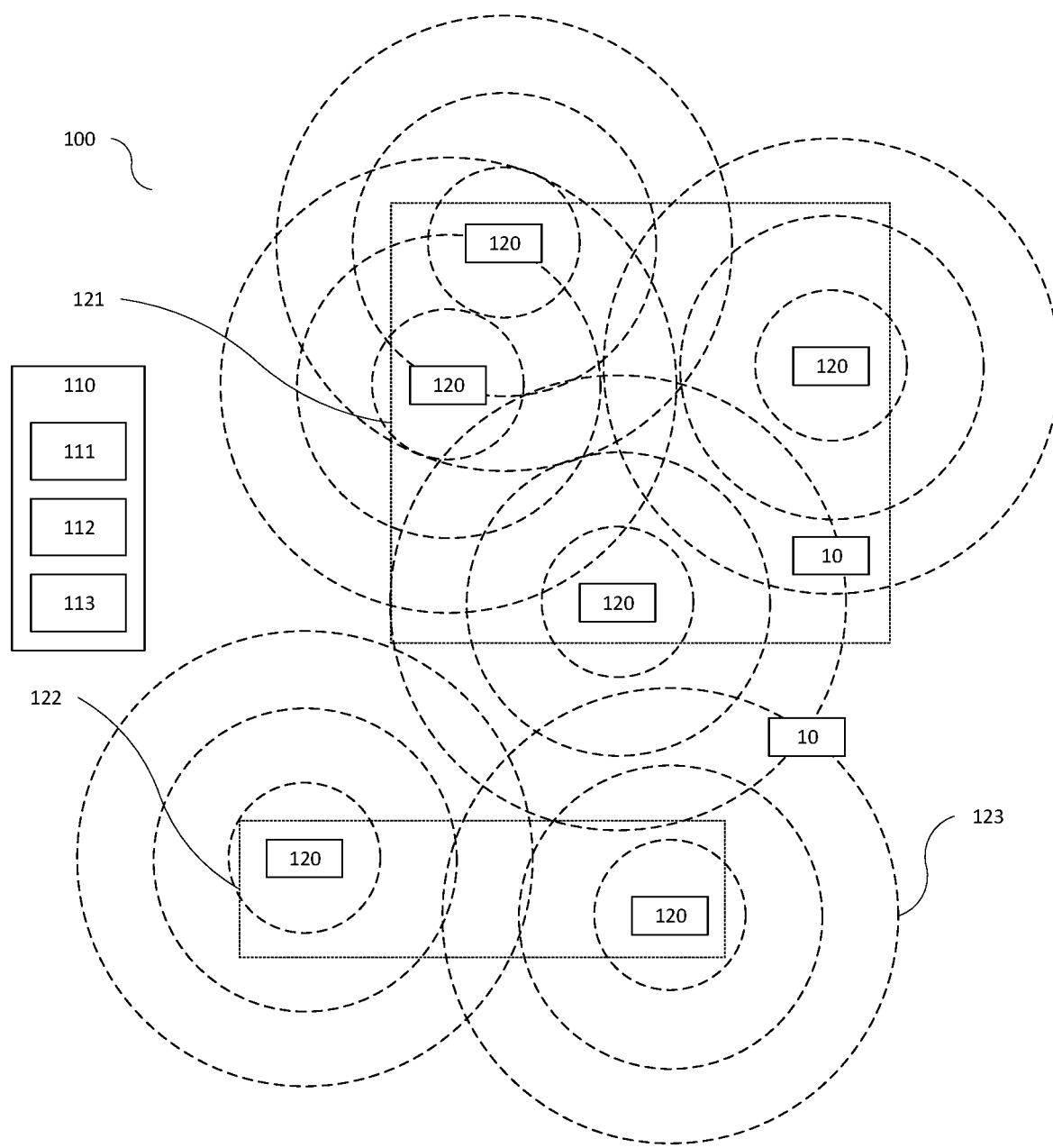
FIG. 7 is an overview of a system according to one or more embodiments of the invention, comprising a central control module and a plurality of FMCW Doppler radars arranged in several groups.

FIG. 7 illustrates a system 100 according to one or more embodiments of the present invention, the system 100 being specifically adapted for detecting respective ranges and velocities to target objects 10 moving through space in relation to one or several of a plurality of co-located FMCW Doppler radars 120. It is realized that FIG. 7 is provided with the purpose of clarifying the presently used principles, and that the geometric layout of the system 100 may vary in practice.

The system 100 may comprise a central control module 110, arranged to communicate with each of the FMCW Doppler radars 120 so as to synchronize their behavior in terms of swept transmissions of the type discussed above. Alternatively, the system 100 may not comprise such a central control module 110, in which case each FMCW Doppler radar 120 may comprise a set of predetermined behavior rules and/or communication functionality for communicating between radars 120 so as to establish a peer-to-peer direct collaboration with the aim of achieving synchronization of said type, coupled with a common time reference as discussed above.

At any rate, the system 100 comprises a control function, being implemented in hardware and/or software, the control function being centralized to the central control module 110 and/or distributed across several of said FMCW Doppler radars 120, and then locally executed in the respective control logic 209 of each involved radar 120. It is this control function that in turn is arranged to provide reduced interference for each of said FMCW Doppler radars 120 by performing said synchronizing across the FMCW Doppler radars 120 in question.

The central control module 110 may comprise a centralized clock function 111, that in turn may comprise a receive antenna for a global time reference signal, such as a GPS signal. The central control module 110 may use this clock function 111 to perform said synchronization, with respect to time offsets, across the FMCW Doppler radars 120.

The central control module 110 may also comprise a control logic 112, that may be implemented in suitable software. The control logic 112 may be a part of, or constitute, said control function.

Furthermore, the central control module 110 may comprise communication means 113, corresponding to communication means 211 discussed above, for communicating with the individual FMCW Doppler radars 120.

FIG. 7 also illustrates various FMCW Doppler radars 120, sorted into a first group 121 of such FMCW Doppler radars 120 and a second group 122 of such FMCW Doppler radars 120. It is realized that there may be more than two such groups of FMCW Doppler radars 120.

In general, the present inventors envision that the system 100 may comprise at least three FMCW Doppler radars 120, in some cases at least five FMCW Doppler radars 120 or even at least ten FMCW Doppler radars 120 Furthermore, each of the FMCW Doppler radars 120 of the system 100 being synchronized using the presently disclosed methods may be arranged at the most 5,000 meters, such as at the most 3,000 meters, such as at the most 1,000 meters, such as at the most 500 m, such as at the most 100 m, from its closest peer FMCW Doppler radar 120.

FIG. 7 illustrates electromagnetic waves 123 (swept radar signals) being emitted from each co-located FMCW Doppler radar 120. It is noted that in a real-life scenario, the antennas 201, 202 will have certain directionality, but this fact is ignored for reasons of simplicity in FIG. 7.

In the present context, that the FMCW Doppler radars 120 are "co-located" means that they affect each other at least pairwise with respect to interference.

More precisely, and as is illustrated in FIG. 7, each of the FMCW Doppler radars 120 may be affected by interference from at least one other FMCW Doppler radar 120, at least when configured according to some possible configuration. Specifically, there are preferably no completely isolated "islands" of FMCW Doppler radars 120 in the sense that no single FMCW Doppler radar 120 of one such "island" experiences interference from any FMCW Doppler radars 120 of any other such "island". In case two or more such "islands" exist, they would be considered belonging to different systems 100 in the present terminology.

In this context, to be "affected by interference" means that interfering electromagnetic radar waves arriving at the FMCW Doppler radar 120 in question have a power above a minimum sensitivity of the victim FMCW Doppler radar 120 in question, after filtering in the victim FMCW Doppler radar 120, so as to adversely affect the output information from the victim FMCW Doppler radar 120.

Each target object 10 to be detected will be present within a detecting range of at least one FMCW Doppler radar 120.

In FIG. 2, the FMCW Doppler radar 200 comprises only one receive antenna 202. It is, however, realized that one or several of the FMCW Doppler radars 120 used in the system 100 may comprise more than one receive antenna 202. This may, for instance, achieve that the FMCW Doppler radar 200 in question is capable of detecting a relative direction to a tracked target object 10. The principles described herein are equally applicable also in this case.

In example embodiments of the present invention, the system 100 is arranged to track target objects 10 in the form of sports objects in flight, such as balls in flight, for instance baseballs or golf balls in flight. In some embodiments, the system 100 is used at a golf practice range, such as a driving range having a plurality of bays for hitting golf balls that are to be tracked using the system 100. In this case, a plurality of FMCW Doppler radars 120 are provided to jointly cover a desired ground area and/or air volume in connection to the range in question.

Various types of computers can be used in the system 100. The central control module 110 (and specifically the control logic 112) and each of the FMCW Doppler radars 120 (and in particular the control logic 209) constitute examples of such computers.

The essential elements of a computer, in general, are a processor for performing instructions and one or more memory devices for storing instructions and data. As used herein, a "computer" can include a server computer, a client computer, a personal computer, embedded programmable circuitry, or a special purpose logic circuitry. Such computers can be connected with one or more other computers through a network, such as the internet, or via any suitable peer-to-peer connection for digital communications, such as a Bluetooth® connection.

Each computer can include various software modules, which can be distributed between an applications layer and an operating system. These can include executable and/or interpretable software programs or libraries, including various programs that operate, for instance, as a target object 10 detection program, a 2D target object 10 tracking program, and/or a target object 10 3D tracking program. Other examples include an FMCW Doppler radar time sweep offset and/or frequency sweep offset synchronization program. The number of software modules used can vary from one implementation to another and from one such computer to another. Each of said programs can be implemented in embedded firmware and/or as software modules that are distributed on one or more data processing apparatus connected by one or more computer networks or other suitable communication networks.

Figure 8:
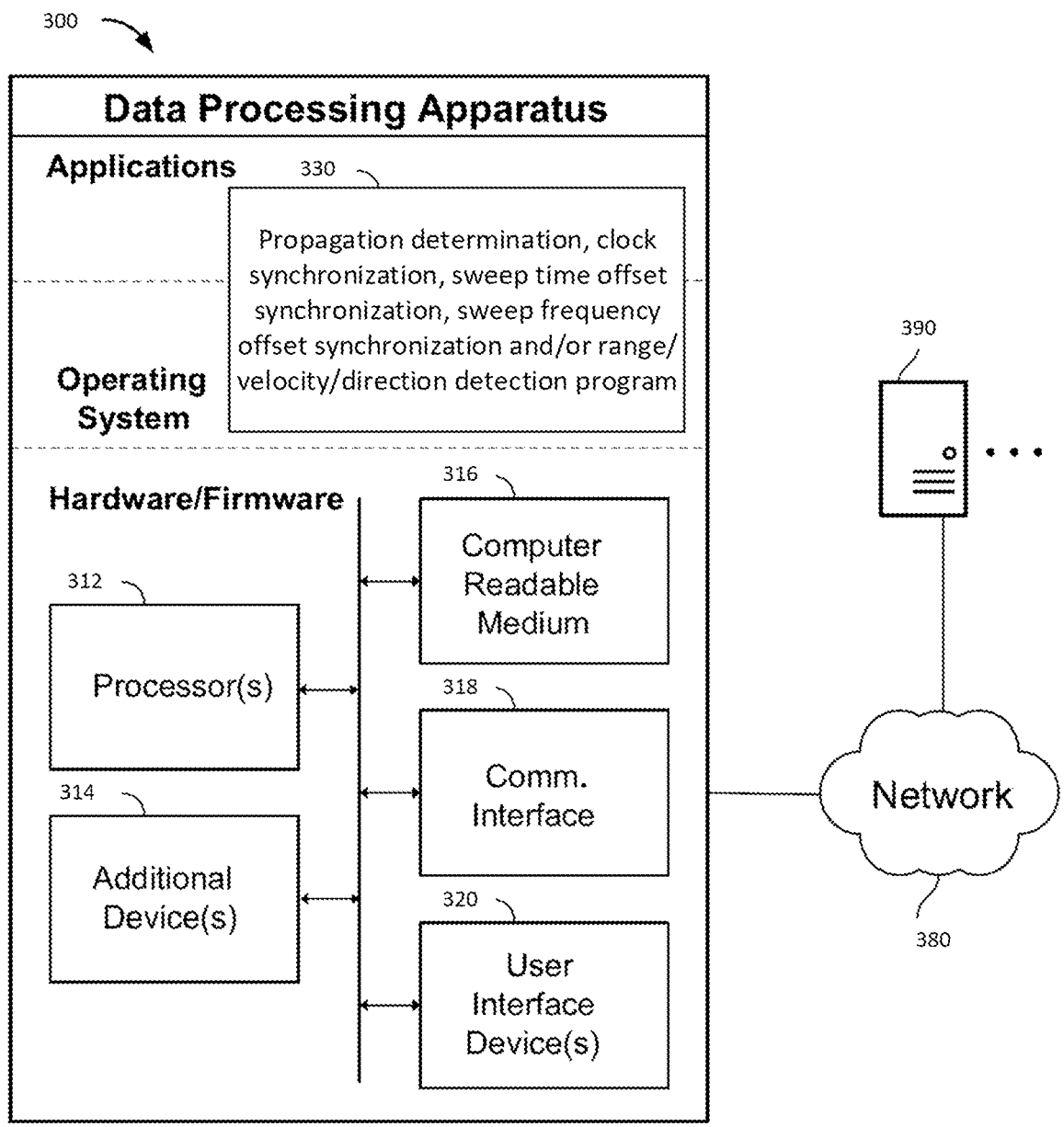
FIG. 8 is a simplified illustration of a data processing apparatus.

FIG. 8 illustrates an example of such a computer, being a data processing apparatus 300 that can include hardware or firmware devices including one or more hardware processors 312, one or more additional devices 314, a non-transitory computer readable medium 316, a communication interface 318, and one or more user interface devices 320. The processor 312 is capable of processing instructions for execution within the data processing apparatus 300, such as instructions stored on the non-transitory computer readable medium 316, which can include a storage device such as one of the additional devices 314. In some implementations, the processor 312 is a single or multi-core processor, or two or more central processing units (CPUs). The data processing apparatus 300 uses its communication interface 318 to communicate with one or more other computers 390, for example, over the network 380. Thus, in various implementations, the processes described can be run in parallel or serially, on a single or multi-core computing machine, and/or on a computer cluster/cloud, etc.

The data processing apparatus 300 includes various software modules, which can be distributed between an applications layer and an operating system. These can include executable and/or interpretable software programs or libraries, including a program 330 that constitutes the local control logic 209 of an individual FMCW Doppler radar 200 as described herein, in turn arranged to perform at least part of a method of the herein-described type, such as one of several of the propagation determination step S2, the clock synchronization step S3, the sweep time offset synchronizing step S4, the sweep frequency offset synchronizing step S5 and the object detection step S6. The program 330 may also constitute the control logic 112 as described herein, in turn arranged to perform at least part of a method of the herein-described type, such as one of several of the propagation determination step S2, the clock synchronization step S3, the sweep time offset synchronizing step S4, the sweep frequency offset synchronizing step S5 and the object detection step S6. Moreover, the program 330 may also be a program for detecting respective ranges, velocities and/or directions of objects 10 moving through space in relation to at least one of at least two co-located FMCW Doppler radars 120.

Examples of user interface devices 320 include a display, a touchscreen display, a speaker, a microphone, a tactile feedback device, a keyboard, and a mouse. Moreover, the user interface device(s) need not be local device(s) 320, but can be remote from the data processing apparatus 300, e.g., user interface device(s) 390 accessible via one or more communication network(s) 380. The data processing apparatus 300 can store instructions that implement operations as described in this document, for example, on the non-transitory computer readable medium 316, which can include one or more additional devices 314, for example, one or more of a floppy disk device, a hard disk device, an optical disk device, a tape device, and a solid state memory device (e.g., a RAM drive). Moreover, the instructions that implement the operations described in this document can be downloaded to the non-transitory computer readable medium 316 over the network 380 from one or more computers 390 (e.g., from the cloud), and in some implementations, the RAM drive is a volatile memory device to which the instructions are downloaded each time the computer is turned on.

It is realized that the described computer hardware can be physical hardware, virtual hardware or any combination thereof.

Hence, the system 100 is arranged to perform a method according to one or more embodiments of the present invention for providing reduced interference for each of said FMCW Doppler radars 120.

The present invention furthermore relates to a computer software product, arranged to perform said method when executing on computer hardware of said type of the central control module 110 and/or each or several of the set of distributed FMCW Doppler radar devices 120. The computer software product may hence be deployed as a part of the system 100 so as to provide the functionality required to perform the present method.

Both said system 100 and said computer software product are hence arranged to detect respective distances to and velocities of target objects 10 moving through space in relation to one or several of the plurality of co-located FMCW (Frequency Modulated Continuous Wave) Doppler radars 120, by comprising or embodying the above-mentioned control function in turn being arranged to provide reduced interference for each of said FMCW Doppler radars 120 by performing the method steps described herein, in particular the steps belonging to the below-described synchronization procedures.

In general, everything that is said in relation to the present method is equally applicable to the present system and to the present computer software product, and vice versa.

Figure 9:
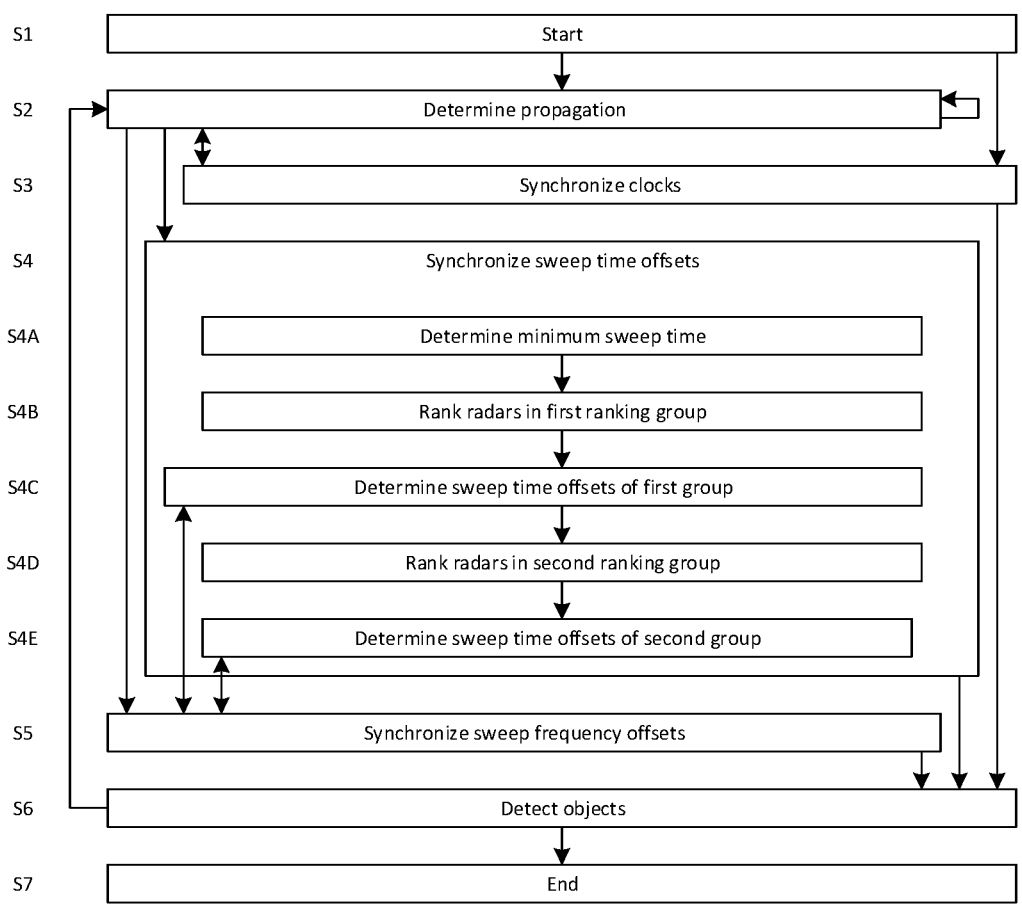
FIG. 9 is a flowchart illustrating a method.

Turning now to FIG. 9, a method according to one or more embodiments of the present invention is illustrated, the method being for providing reduced interference for a plurality of colocated FMCW Doppler radars 120 of said type, each of the FMCW Doppler radars 120 being used in the system 100 to detect respective distances to and velocities of target objects 10 moving through space in relation to the FMCW Doppler radar 120 in question.

The FMCW Doppler radars 120 are preferably interconnected for inter-radar communication, directly or via the central control module 110, as described above, for synchronizing the radars 120.

However, in alternative embodiments at least some, such as all, of the FMCW Doppler radars 120 are not interconnected for inter-radar communication. Instead, they can be synchronized using a common reliable time reference (such as a GPS signal locally received at each non-connected FMCW Doppler radar 120) and a set of predetermined local synchronization parameter settings applied to each respective non-connected FMCW Doppler radar 120. In this latter case, synchronization may be achieved by determining and implementing values of such synchronization parameter before operation of the system 100 for detecting and tracking target objects 10, and such synchronization may then be updated repeatedly or as needed. Such synchronization and re-synchronization may be performed based on measurement information obtained by a measurement of inter-radar interference of the type described below. For non-connected FMCW Doppler radars 120, such interference measurement would then involve a manual measuring step or be based on a predetermined transmission schedule of test signals for each of the participating FMCW Doppler radars in relation to the common time reference, making it possible for each non-connected FMCW Doppler radar 120 to reliably measure a time-of-flight and total interference of an electromagnetic radar signal received from a particular (or each) identified other FMCW Doppler radar 120.

The synchronization (in terms of determination of suitable inter-radar time-offsets) of the FMCW Doppler radars 120 may generally be based on an initial and/or repeated measurement of a time-of-flight or propagation time from each interfering FMCW Doppler radar 120 to each of a set of corresponding victim FMCW Doppler radars 120. Such time-of-flight or propagation time may include several times, due to multi-path propagation. Due to multi-path, several distinct values of propagation time delay can be estimated; one for each path. In general, the time-of-flight or propagation time relevant to the present purposes is the longest time-of-flight or propagation time that reaches the victim FMCW Doppler radar 120 in question at a signal strength that after filtering is above a relevant signal-to-noise ratio and/or is strong enough to provide interference at the victim FMCW Doppler radar 120 in question being detrimental to a target object 10 detection or tracking by the victim FMCW Doppler radar 120 in question.

As an alternative to such measurement, in some embodiments propagation times and/or interference levels are calculated based on a known geometric location of each of the considered FMCW Doppler radars 120. Such geometric locations may be obtained by physical measurement and/or by reading a respective location at each FMCW Doppler radar 120 in question from a received geolocation signal, such as GPS, by the FMCW Doppler radar 120 in question. It is realized that this alternative does not automatically take into consideration multi-path propagation, but may in some cases provide adequate information and may then be preferred due to the simpler configuration. It is also feasible to introduce an extra time-margin in the procedure to account for multipath having an assumed maximum propagation time delay. Mutual interference levels could, however, be estimated based on the radar equation considering free space propagation loss and known positions and attitudes of the radars. In some embodiments, a predetermined model of the physical environment affecting propagation between FMCW Doppler radars 120 may also be used.

Generally, according to one or more embodiments of the present method respective frequency sweep transmission time offsets and respective sweep frequency offsets are selected for each FMCW Doppler radar 120. In particular, the sweep time offset is individually adjusted for each FMCW Doppler radar 120 (in relation to other radars) so as to allocate interference in the IF, or target object 10 range, domain with the purpose of minimizing the effect of such interference on measurement outputs of the FMCW Doppler radar 120 in question; whereas the sweep frequency offset may be individually adjusted for each FMCW Doppler radar 120 in relation to other radars) so as to allocate interference in the target object 10 velocity domain. Such individual adjustment may in some cases mean that one of said offsets is kept at zero or not changed for one or several FMCW Doppler radars 120, while the offset in question is altered or set to a nonzero value for other FMCW Doppler radars 120. The adjustment is made based on the interference levels and propagation times between FMCW Doppler radars 120 determined as described above. As will be seen below, the sweep frequency offset may take place on a group level, so that all FMCW Doppler radars 120 belonging to a particular group 121, 122 are frequency offset by the same amount.

The present method may comprise a re-occurring assessment procedure in which the mutual interference and propagation time delays of the FMCW Doppler radars 120 is estimated. Based on the information output from that procedure, a set of optimized sweep (chirp) transmission time offsets and carrier frequency offsets are determined by said (central or distributed) control function, such as by the control module 110. The severity of the interference from one FMCW Doppler radar 120 on some or all remaining FMCW Doppler radars 120 is assessed, and measured propagation time delays may then be used in the optimization of the time slot distribution. For this purpose, each FMCW Doppler radar 120 may be equipped with a measurement function to enable the derivation of this information. The results of the measurements may be shared by the FMCW Doppler radars 120 over the network and processed in a distributed manner, or measurements may be sent to the central control module 110 for further information aggregation.

In a first step S1, the method starts.

In a subsequent propagation determination step S2, expected electromagnetic wave propagation times are determined/estimated between pairs of said FMCW Doppler radars 120. This propagation determination step S2 may be performed as described above, and may in particular also comprise measuring an expected level of interference between such pairs of FMCW Doppler radars 120. The term "expected" refers to times and levels that are to be expected during the below-described target object 10 detection step S6.

The expected electromagnetic wave propagation times and/or expected level of interference may be measured for each pair of two FMCW Doppler radars 120 in the system 100.

The determination of such mutual interference may be performed without considering attenuation in the filter chains 206, 206' of the receiving FMCW Doppler radar 200. Instead, the propagation determination step S2 may be designed so that it will measure interference that falls within the passband of all listening (victim) radars, as will be explained below. This means that the determination/estimation of the mutual interference, which may then be used for sorting FMCW Doppler radars 120 with respect to the interference they inflict according to the below-described method steps, may be not directly dependent on the IF frequency attenuation of the filter chain 206, 206'.

The propagation determination step S2 may comprise one FMCW Doppler radar 120 in turn activating its transmitter 201 and all other FMCW Doppler radars 120 simultaneously listening for the transmitting FMCW Doppler radar 120 in order to extract information regarding the interference level that they experience from the transmitting FMCW Doppler radar 120. Such transmission and listening may be performed using the same antennae 201, 202 as for target object detection in step S6.

Furthermore, the propagation determination step S2 may comprise one or several of said FMCW Doppler radars 120 emitting a respective electromagnetic test signal. Such an electromagnetic test signal may then be detected, such as in terms of interference strength, and timed, by one or several of the other FMCW Doppler radars 120.

In particular, the transmitting FMCW Doppler radar 120 may use a special-purpose waveform specifically designed for interference assessment. It could for example be a pure (single tone) CW (Continuous Wave) signal at a predetermined frequency, known to all participating FMCW Doppler radars 120; or a standard FMCW waveform as detailed below.

Propagation times may be estimated as the longest respective path (among a possible set of multi-path transmission paths) with power levels above a predetermined threshold.

In case the test signal is a pure CW electromagnetic signal, the propagation times may in some cases not be directly measured, but could instead be computed as the direct path propagation times using known 2D or 3D locations of the FMCW Doppler radars 120 in question. For instance, this information could be conveniently derived from a respective built-in GPS equipment in each FMCW Doppler radar 120, as mentioned above.

Another alternative would, however, be that the electromagnetic test signal is an FMCW wave comprising a waveform having a non-constant frequency. For instance, such an FMCW wave may have a common waveform, known to and used by several or all FMCW Doppler radars 120. The common waveform may for instance be the same basic waveform as used by the regular radar functions when performing detection of target objects 10 in step S6 (see below).

Put more generally, the propagation determination step S2 may hence comprise each FMCW Doppler radar 120 receiving said electromagnetic test signal from a particular sending one of the FMCW Doppler radars 120 and determining a maximum detected propagation time of the received electromagnetic test signal wave. Preferably, this determination takes into consideration any multi-path wave trajectories, by considering only received electromagnetic test signals having a minimum power at reception of the receiving FMCW Doppler radar 120 in question.

Moreover, the propagation determination step S2 may also comprise measuring, at each FMCW Doppler radar 120 receiving the electromagnetic test signal in question, a maximum power of the received electromagnetic test signal, or at least a maximum interference detected based on the received electromagnetic test signal.

The FMCW electromagnetic test signals emitted from different FMCW Doppler radars 120 may in some embodiments be not identical, but be frequency offset one in relation to the other. For instance, the FMCW electromagnetic test signal having a common waveform emitted from each emitting FMCW Doppler radar 120 may have a carrier frequency that is offset in relation to a carrier frequency used for respective electromagnetic test signals by each of the other FMCW Doppler radars 120.

By slightly offsetting the frequency of the transmitting FMCW Doppler radars 120 in relation to its peer radars 120, problems with any used clutter filters in receiving FMCW Doppler radars 120, that filter out zero velocity (zero Doppler) information, is avoided. Such an offset may be small, such as less than 10% or less across any two FMCW Doppler radars 120.

The FMCW test signal alternative allows estimation of the propagation time delay; the fundamental accuracy being determined by how accurately each receiving FMCW Doppler radar 120 can lock onto the common time reference. It is anticipated that the deviations from the common clock reference in practical cases could be as low as 0.05 microseconds (corresponding to a bias on the order of about 15 m).

The propagation determination step S2 may comprise estimating propagation times and/or interference magnitude for each FMCW Doppler radar 120 as receiving radar, or only for one or a subset of the FMCW Doppler radars 120. In either case, the propagation determination step S2 may be launched anew with respect to the same or different FMCW Doppler radars 120 at later times, depending on current circumstances. One example is when a new FMCW Doppler radar 120 is added to the system 100. In this case, it is preferred to perform the propagation determination step S2 for all FMCW Doppler radars 120 to take into consideration the new operating prerequisites resulting from the addition of the new FMCW Doppler radar 120 in question to the system 100. Such an addition may change the operation prerequisites across the whole system 100.

In case the test signal is an FMCW, the test signal may be adapted so that the received test signal at one or several, such as all, of the receiving radars falls into the filter passband thereof. This can be accomplished in a couple of different ways, as will now be described.

Using the following methodology, the propagation path delay can be estimated from an interfering FMCW Doppler radar 120 in a multipath environment along with the power levels associated with each path at the victim FMCW Doppler radar 120, and specifically by designing the test signal to fall inside the receiver bandwidth of the victim radar.

Figure 19:
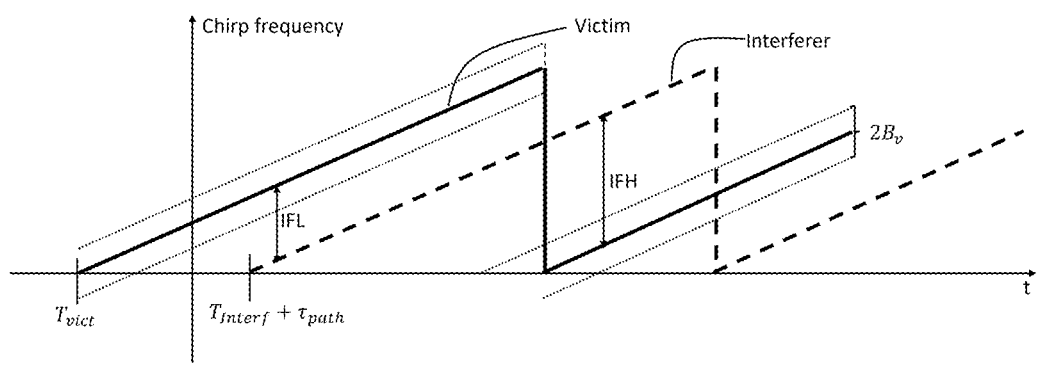
FIG. 19 shows respective waveforms for a victim radar and an interferer radar.

With reference to FIG. 19, it can be seen why there is a risk to miss the estimation of significant multipath components in this context.

Hence, FIG. 19 shows the separation of test signal (dashed) and victim radar (solid) mixer sweep at the input of the victim radar's mixer. The "dotted sweeps" located at $+/-B_v$ on either side of the main victim sweep indicate the receiver bandwidth $B_v$. The IF frequencies at the output of the mixer (prior to any filtering) are (there will be two components) IFL and IFH. As $T_{vict}-T_{Interf}+\tau_{path}$ changes, so will IFL and IFH. Evidently, to measure the multipath component, $T_{vict}-T_{Interf}$ must be selected so that the test signal sweep falls with the region confined by the dotted lines, i.e., IFL<$B_v$ (which is not satisfied in FIG. 19).

It is first assumed that the time offset of the chirp sequence for the radar transmitting the test signal is the same as the time offset used by the victim (listening) radar, and further that the A/D converter 208 at the victim radar has a large sampling frequency so that any aliasing can be neglected.

Since the test signal is periodic with the chirp repetition interval, $T_{Rep}$, multipaths that correspond the direct path propagation time delay, $\tau$, plus multiples of distances $cT_{Rep}$, (one-way propagation) will nominally generate the same IF frequency at output of the mixer at the victim radar. This is because when the victim radar receives the direct path component corresponding to transmitted chirp i, chirps i−1, i−2 etc. that were previously transmitted will also arrive at the victim radar (if there are strong multipath components with propagation time delays of $\tau-kT_{Rep}$, $\tau+(k+1)T_{Rep}$ etc.). So, the highest possible IF frequency that could possibly arise (prior to any filtering) due to any multipath component is upper limited by $IF_{max}=\mu T_{Rep}$, where $\mu$ is the (common) chirp rate.

It is noted that, as the delay increases, the incoming interference chirp and the victim radar mixer sweep is increasingly separated, causing a negative IF (negative ranges that may be filtered out depending on radar filter design) and a positive IF (which is kept). Furthermore, the power of the positive frequency component decreases as the separation grows. Roughly, a time separation by $0.5T_{Rep}$ reduces the power in the positive frequency component by 3 dB.

The IF frequency depends on the delay as $f_{IF}=\mu\tau$, where $\tau$ is the propagation time delay. Considering a finite sampling frequency, $F_s$, the maximum unambiguous IF frequency that can be observed needs to satisfy $f_{IF}=\mu\tau \leq 0.5F_s$. This corresponds to a maximum range of (for one way propagation, $\tau=R/c$)

$$f_{IF} = \mu\tau = \mu\frac{R}{c} \leq 0.5\ F_s \rightarrow R \leq \frac{cF_s}{2\mu} \quad (3)$$

The bandwidth of the receivers' radars filter chain 206, 206' is designed so that its bandwidth corresponds to the maximum interesting (for the specific tracking application) IF frequency to pass, and which is usually much less than $IF_{Max}$, see FIG. 19. As an example, in one radar the interesting range interval could be 300 m for detection of target objects 10, (i.e., two-way propagation) which translates to 600 m for one-way propagation while the one-way distance corresponding to the $T_{Rep}$ used could be, e.g., 16 km, i.e., the receiver only covers 3.75% of the maximum possible IF frequency, $IF_{Max}$.

Therefore, if this fact is not considered when transmitting test signals (i.e., using the same or random time-offsets of interfering and victim sweep start times), all significant multipath components may not be adequately detected.

The present inventors foresee at least two approaches to solve this problem, as described in the following. These approaches can be used individually or in concert.

In the first of said two approaches, the transmitting FMCW Doppler radar 120 uses a sequence of test signals.

Then, if each such test signal will have a separate time-offset, the effective apparent time delay at the victim radar will be varied, as will the resulting IF frequencies at the output of the corresponding mixer 204 in question. If the different time steps (for the transmitter radar time offset) used in the sequence of test signals are properly designed, one can guarantee that all multipath components (for some time-offset) will fall within the passband of the victim radar. Hence, the power levels of each multipath component and its propagation time delay (considering the known delays used by the radar transmitting the sequence of test signals) can be determined.

As an example, the case is considered where all receiver radar bandwidths are the same and denoted by $B_v$. Furthermore, the bandwidth of the chirps is denoted $B_{Chirp}$. Then, one could define a uniform grid of time-offsets for the test signals with a number of grid points given by $$n = \left\lceil \frac{B_{Chirp}}{kB_v} \right\rceil \quad (4)$$

where is k a tuning parameter in the interval $0<k\leq 1$, for example k=0.9, and $\lceil x \rceil$ rounds upwards to the nearest integer.

The time increment is set as $$\Delta T = T_{UpChirp}/n \quad (5)$$

As an example, if $B_{Chirp}$=40 MHz, $B_v$=2 MHz and, k=0.9 we get $$\left\lceil \frac{B_{Chirp}}{kB_v} \right\rceil = 23,$$

and assuming a 50 micro seconds up-sweep, i.e., $T_{UpChirp}=50\cdot 10^{-6}$, we get $\Delta T=2.17\cdot 10^{-6}$.

Obviously, with $\mu=B_{Chirp}/T_{UpChirp}$, we have $$\mu\Delta T = \frac{B_{Chirp}}{T_{UpChirp}} \frac{T_{UpChirp}}{n} = \frac{B_{Chirp}}{\left\lceil \frac{B_{Chirp}}{kB_v} \right\rceil} \leq kB_v \quad (6)$$

i.e., the IF frequency due to a multipath component at an arbitrary victim radar changes less than $kB_v$ in between two consecutive time-offsets. This guarantees that all multipath components can be detected (as time-offsets vary), and the corresponding propagation times can be estimated.

In the second of said approaches, the victim radars use time offsets derived from position data. In this case, the transmitter radar sends only "one test signal" (a test signal is typically a number of chirps), with time-offset set to zero.

The listening radars (the victim radars) use time-offsets (i.e. the receiver radar delays its reference waveform input to the mixer 204) corresponding to the direct path propagation derived from position data (of own radar and transmitting radar). Nominally, the time offset in a victim radar should be the same as the computed propagation time, possibly changed somewhat to account for filter characteristics in the receiver filter chain 206, 206'. However, the time offset should be close to nominal propagation time so that the direct path response gets a low IF frequency. i.e., appears at close range.

Any significant multipath component will then get a higher IF frequency (appear at longer ranges). In this way, the maximum multipath delay relative direct path delay that can be detected is nominally equal to the range coverage of the regular radar function. Since the direct path propagation delay is known, the additional multipath propagation time can be computed from the range difference of the multipath components appearing in the range velocity map to the direct path component.

The propagation determination step S2 can be split up in several sub steps, the sub steps together being arranged to obtain a complete picture of determined mutual interference and propagation path delays. In such an approach, each such sub step could cover a respective subset of one or several transmitting FMCW Doppler radars 120 (not simultaneous, but cycle through), which would then be followed by a time interval of regular radar target object 10 tracking operation until the next sub step of the propagation determination step S2 is invoked to cover the next set of FMCW Dopper radars 120, and so forth.

Finally, in case the propagation determination step S2 determines that one or several of the FMCW Doppler radars 120 do not experience any interference from, and do not inflict interference to any other FMCW Doppler radars 120, such radars 120 may be removed from further consideration. In a sense, such non-interfering FMCW Doppler radars 120 can be considered not part of the system 100 for the present purposes. Such determination can be performed iteratively or repeatedly over time, so that what is considered radars belonging to the same "system" may change over time.

Any propagation determination step S2 may be followed by synchronization steps S4, S5 (see below).

In a clock synchronization step S3, a respective clock of each of said FMCW Doppler radars 120 may be synchronized. This synchronization may take place as described above, such as based on a common received geolocation signal or a common received time signal broadcast from the central control module 110. The respective synchronized clock of each FMCW Doppler radar 120 may then be used in combination with a respective sweep time offset to trigger an FMCW sweep (see below). The clock synchronization step S3 may take place continuously, intermittently or when specifically triggered. It may take place before or after the propagation determination step S2. In preferred embodiments, all clocks are synchronized across FMCW Doppler radars 120 when performing each propagation determination step S2.

In a sweep time offset synchronizing step S4, different respective sweep time offsets are selected, with respect to each FMCW Doppler radar 120 in a certain first group 121 of said FMCW Doppler radars 120.

In a sweep frequency offset synchronizing step S5, a certain non-zero sweep frequency offset (here denoted a second sweep frequency offset) is selected with respect to a certain second group 122 of said FMCW Doppler radars 120. This second sweep frequency offset is relative to a sweep frequency pattern used for FMCW Doppler radars 120 belonging to said first group 121. It is noted, in this context, that the terms "sweep frequency offset", "carrier frequency offset" and "center frequency offset" have the same meaning and should be interpreted as synonyms.

The first group 121 may be disjoint to said second group 122. The first group 121 and the second group 122 may in combination comprise all FMCW Doppler radars 120 of the system 100, but there may also be additional disjoint groups (a third group, a fourth group, and so forth) of FMCW Doppler radars 120, that then together may constitute all FMCW Doppler radars 120 of the system 100.

It may be the case that all FMCW Doppler radars 120 belonging to the same group (such as the first group 121 or the second group 122) are associated with different sweep time offsets. It may also be the case that all FMCW Doppler radars 120 belonging to the same group are associated with the same sweep frequency offset, and that the respective sweep frequency offsets used for different groups are always different.

As will become clear from the following, what FMCW Doppler radars 120 that should belong to what group may be determined dynamically, for instance as a part of the sweep time offset synchronizing step S4. Hence, this division of FMCW Doppler radars 120 into groups 121, 122 may change over time as a result of consecutive iterations (see below) of the present method, for instance by adding or removing FMCW Doppler radars 120 in the system 100 or by other operation prerequisites changing. Such regrouping is preferably performed in relation to a reiteration of the propagation determination step S2.

It is realized that the sweep time offset synchronization step S4 is performed at least with respect to the Doppler radars 120 belonging to the first group 121, but that this step may be performed also in relation to other Doppler radars 120, such as those belonging to the second group 122, and to any subsequent group(s). In particular, and as will be exemplified below, the sweep time offset synchronization step may be performed iteratively, one group 121, 122 at a time, and each such group 121, 122 then being subjected to a respective sweep frequency offset synchronization step.

Said sweep frequency pattern used for FMCW Doppler radars 120 belonging to said first group 121 may be associated with a "first" sweep frequency offset, which may be a zero offset, whereas a sweep frequency pattern used for FMCW Doppler radars 120 belonging to the second (and any subsequent) group 122 may be associated with a subsequent ("second", "third", etc.) sweep frequency offset, each such subsequent sweep frequency offset being non-zero in relation to each of the other groups.

In a subsequent step S6, velocity, range and/or direction of target objects 10 may be detected by one or several of the FMCW Doppler radars 120, as measured in relation to each respective such FMCW Doppler radar 120. Such detection may take place in a manner which is conventional in itself, and uses the sweep time and sweep frequency offsets determined for each individual FMCW Doppler radar 120 in the way described herein. Based on such detected velocities, ranges and/or direction of target objects 10, tracks of such target objects 10 can be determined and displayed to a user of the system 100 or used in any other manner, such as calculating and showing various shot metrics such as carry length and ball spin. Such detection and use is well-understood in itself, and will not be detailed herein.

In a subsequent step S7, the method ends.

The present method may be implemented so that respective individual time-offsets are allotted to FMCW Doppler radars 120 one by one in an order determined by how much each FMCW Doppler radar 120 interferes with the rest of the FMCW Doppler radars 120. Below, the terminology "isolated" FMCW Doppler radar 120 is used, meaning any FMCW Doppler radar 120 that has been given a time-offset of its own, at least as compared to other FMCW Doppler radars 120 belonging to the same group 121, 122 (for instance depending on if all FMCW Doppler radars 120 have been grouped yet). In a sense, such FMCW Doppler radars 120 are "isolated" from the rest of the FMCW Doppler radars 120 since they will generate, or sense, very little interference to, or from, the rest of the FMCW Doppler radars 120. This will be clarified below.

In the following, an example of a methodology for performing the sweep time offset synchronization step S4 and the sweep frequency offset synchronization step S5 is provided, in connection to FIGS. 10-13.

Often, the number of FMCW Doppler radars 120 that are to coexist is so large so that it is not possible to allocate a time-offset to each such radar 120 such that all radars 120 can operate without mutual interference. This methodology uses carrier frequency offsets between subgroups to solve this problem. These sub-groups may be determined as a part of the part-algorithm for time-offset selection, as is described in detail below. In this case, the methodology generates respective time-offsets for all radars 120 such that these time offsets allow interference-free operation amongst radars 120 belonging to the same sub-group.

It is pointed out that the above-described propagation determination step S2 may be arranged to determine inter-radar interference without considering attenuation in the filter chains 206, 206' of the receiving radars 120 in question. In this case, the determined/estimated mutual interference will not be dependent on the IF frequency.

As used herein, the term "remaining systems" means the FMCW Doppler radars 120 that have not yet been allocated to a sub-group (and have not yet received their time-offsets).

The following additional notation is used in the following:
$\mathcal{S}$: The set of all FMCW Doppler radars 120.
$\mathcal{S}_i$: The i:th subgroup of FMCW Doppler radars 120.
$\mathcal{S}_{Rem}$: The set of remaining FMCW Doppler radars 120 (at a stage in the procedure)
$\mathcal{M}$: Temporary set of FMCW Doppler radars 120 used in the procedure.
$n_{is}$: The number of FMCW Doppler radars 120 in $\mathcal{S}_i$ (that have been isolated).
$\delta$: The minimum time offset required for a specified receiver filter chain 206, 206' attenuation of the corresponding interfering IF signal entering the receiver filter chain 206, 206' of the victim FMCW Doppler radar 120.
$T_k$: Time offset (determined by algorithm) for FMCW Doppler radar 120 $k$.
$T_{Rep}$: Chirp repetition interval, common to all FMCW Doppler radars 120.
$\tau_{kl}$: Propagation time between FMCW Doppler radar 120 $k$ and FMCW Doppler radar 120 $l$. Note that $\tau_{kl}=\tau_{lk}$.

The set of remaining FMCW Doppler radars 120 is the difference of S and the union of all, so far, determined sub-groups $\mathcal{S}_i$, mathematically defined by $$\mathcal{S}_{Rem} = \mathcal{S} \setminus \bigcup_i \mathcal{S}_i \qquad (7)$$

where $\cup$ denotes the set union and \ denotes the set difference.

Figure 20:
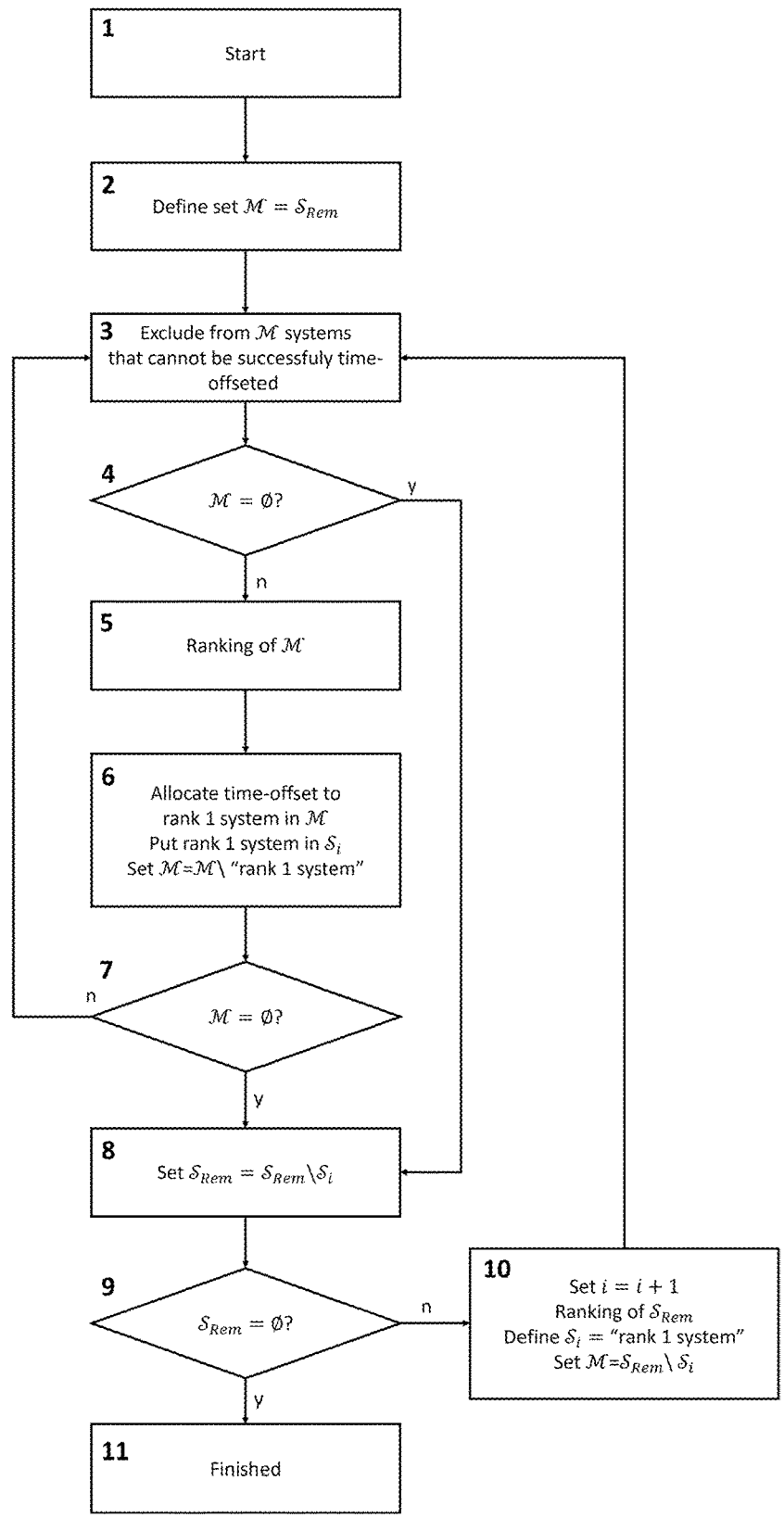
FIG. 20 is a flowchart illustrating a method.

A high-level flow chart of such a procedure is shown as a part of FIG. 9 (steps S4A-S4E), whereas a more detailed flow chart of a particular example of such a procedure is shown in FIG. 20. The description below refers to both FIG. 9 and FIG. 20.

First, in a step S4A (FIG. 9), a suitable nominal minimum time offset $\delta$ is determined, such as based upon filter chain 206, 206' analysis of each receiving FMCW Doppler radar 120 in question. The offset $\delta$ is selected such that the corresponding IF frequency is sufficiently attenuated by the filter chain 206, 206' of the FMCW Doppler radar 120 in question, e.g. at least 80 dB, or even at least 100 dB, attenuation. If receiver filter chains 206, 206' of different FMCW Doppler radars 120 are not identical, and in particular in case they are associated with different IF frequency attenuation, the nominal minimum time offset $\delta$ may be determined based on the FMCW Doppler radar 120 receiver filter chain 206, 206' having the largest bandwidth. Alternatively, the nominal minimum time offset $\delta$ may be treated as a variable and be incorporated that into the procedure in the sense that it is specifically and individually calculated for at least several, such as all, of the possibly interfering pairs of FMCW Doppler radars 120. In general, the nominal minimum time offset $\delta$ may be selected as the shortest time offset that achieve a minimum predetermined attenuation in the considered context.

A certain additional margin may be added to the nominal minimum time offset $\delta$, accounting for an expected clock drift during the time interval between synchronizing to the common reference time source. The size of this margin would be determined on a case by case basis. However, typically one could choose two times the relative clock drift times the clock synching intervals. For example, Denoting the relative clock drift of FMCW Doppler radar 120 $m$ by $\varepsilon_m$, and the clock drift of FMCW Doppler radar 120 $n$ by $\varepsilon_n$, the margin added to $\delta$ could for example be $(\varepsilon_m+\varepsilon_n)T_{sync}$. If GPS is used as time reference, $T_{sync}=1$ and assume $\varepsilon_m=\varepsilon_n=0.1$ ppm (which is probably a bit high for synched FMCW Doppler radar 120), a margin results of 0.2 microseconds.

In general, the nominal minimum relative sweep time offset $\delta$ may be determined based on a minimum sweep time offset producing a desired attenuation (a least producing a predetermined attenuation) of an IF of one of said FMCW Doppler radars 120 experiencing interference from another FMCW Doppler radar 120 and using said minimum relative sweep time offset, for instance a minimum such sweep time offset across all pairs of FMCW Doppler radars 120 in the system 100 achieving a at least such a desired attenuation.

The determination of the minimum relative sweep time offset may be a part of the propagation determination step S2, and hence be performed each time step S2 is performed.

Then, in a step S4B, all FMCW Doppler radars 120 may be ranked based on their total interference on the other radars. In other words, the ranking is an interference ranking. For example, a sum can be formed of respective interference-to-noise ratios of other FMCW Doppler radars 120 due to each particular considered interfering FMCW Doppler radar 120.

This interference ranking may be conducted without any consideration of any filter chain 206, 206' attenuation, if the interference is determined as described above. In other words, in such cases the interference ranking is performed based only on interference falling within the respective passband of each victim FMCW Doppler radar 120.

Hence, an interference ranking is performed of all systems $S$, based on the estimated/determined interference inflicted by an FMCW Doppler radar 120 on the rest of the FMCW Doppler radars in $S$. The rank one FMCW Doppler radar 120 is allocated to the first sub-group 121, i.e. $S_1$, and allocated zero time offset. A sub-group counter i is set to 1, and the set of remaining FMCW Doppler radar 120 $S_{Rem}$ is set to $S_{Rem} = S \setminus S_1$.

In general, this ranking is denoted a "first" ranking, and the FMCW Doppler radars 120 subjected to the ranking are denoted a "first ranking group" of FMCW Doppler radars 120. Note the difference here between "first/second group" and "first/second ranking group".

In the first iteration, the first ranking group may comprise all FMCW Doppler radars 120 in the system 100.

Moreover, the first ranking may be performed according to interference severity in relation to the other FMCW Doppler radars 120 of said first ranking group, and in particular based on such data measured or otherwise determined in the propagation determination step S2.

Then, in a step S4C, for each of the FMCW Doppler radars 120 in the first ranking group, in order from a most severely interfering one of said FMCW Doppler radars 120 to less severely interfering ones of said FMCW Doppler radars 120, a respective first sweep time offset is selected for the FMCW Doppler radar 120 in question, taking into consideration both said determined minimum relative sweep time offset and a propagation time delay of the FMCW Doppler radar 120 in question in relation to other FMCW Doppler radars 120 in the first ranking group for which a respective first sweep time offset has already been selected. It is noted that the "first sweep time offset" here denotes a sweep time offset selected with respect to an FMCW Doppler radar 120 belonging to the first ranking group.

The rank one radar (the one causing most interference to all others) may be associated with a zero sweep time offset, and the other first ranking group radars 120 may be associated with sweep time offsets in relation to this rank one radar sweep time offset.

One or several of the other FMCW Doppler radars 120 in the first ranking group may then be consecutively associated with respective sweep time offsets that provide interference-free operation in relation to other FMCW Doppler radars 120 of the first ranking group that have been allotted respective sweep time offsets, correspondingly. In other words, the former FMCW Doppler radars 120 are thus "isolated" from the other FMCW Doppler radars 120, in the above terminology.

After each such allotting of a sweep time offset to an FMCW Doppler radar 120, another interference ranking may be conducted with respect to any still non-isolated FMCW Doppler radars 120 in the first ranking group. The isolation by associating individual radars with respective sweep time offsets may proceed until there are no more FMCW Doppler radars 120 left in the first ranking group that can be allotted sweep time offsets fulfilling the present conditions in terms of interference-free operation.

The remaining FMCW Doppler radars 120, in other words the FMCW Doppler radars 120 of the first ranking group that cannot be isolated, are then denoted the "second ranking group" of FMCW Doppler radars 120, and the isolated FMCW Doppler radars 120 become the first group 121. Then, the second ranking group alone can be sent into the time-offset selection described above for a second run (using the second ranking group as the first ranking group in the above procedure description), and will then get sweep time offsets relative each other so as to become isolated from each other (within the second ranking group).

The sweep time offsets of the isolated second ranking group members will then be such that the members of the second ranking group will interfere (and will be interfered by) members of the first group 121.

However, the second ranking group can then be separated (from an interference point of view) from the first group by introducing a common (shared) change of the carrier frequency of the FMCW Doppler radars 120 in the second ranking group, such that the interference from the second ranking group in relation to FMCW Doppler radars 120 of the first group 121 will be located at insensitive target object 10 velocity intervals. By symmetry, the interference from the first group 121 on the second ranking group will then be located at corresponding negative target object 10 velocity intervals.

Put more generally, the second ranking group may be identified, out of one or several FMCW Doppler radars 120 in the first ranking group, as the set of radars for which it is determined that it is not possible to select a respective sweep time offset that does not result in a predetermined minimum level of interference during target object 10 tracking operation. In some cases, this may mean that the second ranking group is identified as the set of radars 120 in said first ranking group for which the respective necessary sweep time offset (to avoid potentially detrimental interference) was detected to be longer than a threshold value, i.e. a maximum allowed value. This threshold value may be selected so that inter-sweep interference is risked if not respected.

So, if there were FMCW Doppler radars 120 that could not be isolated after investigating the FMCW Doppler radars 120 in the first ranking group, the same procedure is once again performed but using only the remaining FMCW Doppler radars 120 as a preparation for sweep frequency offset selection (described below).

In other words, and as is illustrated in FIG. 9, in a step S4D, the FMCW Doppler radars 120 of the second ranking group are ranked in order by interference, analogous to the ranking of the first ranking group, described above.

Hence, in this ranking of FMCW Doppler radars 120 of the second ranking group, the ranking is performed according to interference severity in relation to the other FMCW Doppler radars 120 of said second ranking group, and also based on data measured in the propagation determination step S2.

Thereafter, in a step S4E, respective sweep time offsets are determined for the FMCW Doppler radars 120 in the second ranking group, also analogous to what was described above with respect to the first ranking group.

Hence, for each of the FMCW Doppler radars 120 in the second ranking group, in order from a most severely interfering one of said FMCW Doppler radars 120 to less severely interfering ones of said FMCW Doppler radars 120, a respective sweep time offset may be selected for the FMCW Doppler radar 120 in question, taking into consideration both said determined minimum relative sweep time offset and a propagation time delay of the FMCW Doppler radar 120 in question in relation to other FMCW Doppler radars 120 in the second ranking group for which a respective second sweep time offset has already been selected.

As mentioned above, as the first group 121 of FMCW Doppler radars 120 the FMCW Doppler radars 120 may be selected that belong to the first ranking group but not to the second ranking group. As the second group 122 of FMCW one or several Doppler radars 120 FMCW Doppler radars 120 may be selected that belong to the second ranking group.

As is understood, this procedure may be implemented as a recursive procedure.

FIG. 20 illustrates a practical implementation of such a procedure in closer detail, according to the following.

Step 1: At start, $\mathcal{S}_{Rem}=\mathcal{S}\setminus\mathcal{S}_1$, i=1 and $\mathcal{S}_1$ contains the single FMCW Doppler radar 120 in $\mathcal{S}$ with the highest interference ranking.

Step 2: An "intermediate set" $\mathcal{M}$ is defined by setting it equal to the set of remaining FMCW Doppler radars 120 $\mathcal{S}_{Rem}$.

Step 3: Here, all FMCW Doppler radars 120 are excluded from $\mathcal{M}$ that cannot be offset in time such that the mutual interference to the already isolated FMCW Doppler radars 120 in sub-group $\mathcal{S}_i$ can be avoided. The conditions that are checked for each one of the FMCW Doppler radars 120 in $\mathcal{M}$ against all already isolated FMCW Doppler radars 120 in $\mathcal{S}_i$ are the following:

$$T_{21m} \leq T_{22m} \tag{8}$$

where subscript m indicates the m:th system in the set $\mathcal{M}$ and $$T_{21m} = \max_{i\in\{1,\ldots n_{is}\}} (T_i + \tau_{im} + \delta) \tag{9}$$

$$T_{22m} = \max_{i\in\{1,\ldots n_{is}\}} (T_i + T_{Rep} - \delta - \tau_{im})$$

The notation $i \in \{1, \ldots n_{is}\}$ means that the maximization is done over the FMCW Doppler radars 120 in sub-group $\mathcal{S}_i$, and $\tau_{im}$ is the propagation time between FMCW Doppler radar 120 $i$ in $\mathcal{S}_i$ and the m:th FMCW Doppler radar 120 in the set $\mathcal{M}$. The FMCW Doppler radars 120 in $\mathcal{M}$ that do not satisfy the condition are excluded from $\mathcal{M}$.

Briefly referring to FIG. 10, the time offset constraints that may be used in the present procedure will now be discussed before reverting to the flow chart shown in FIG. 20.

Figure 10:
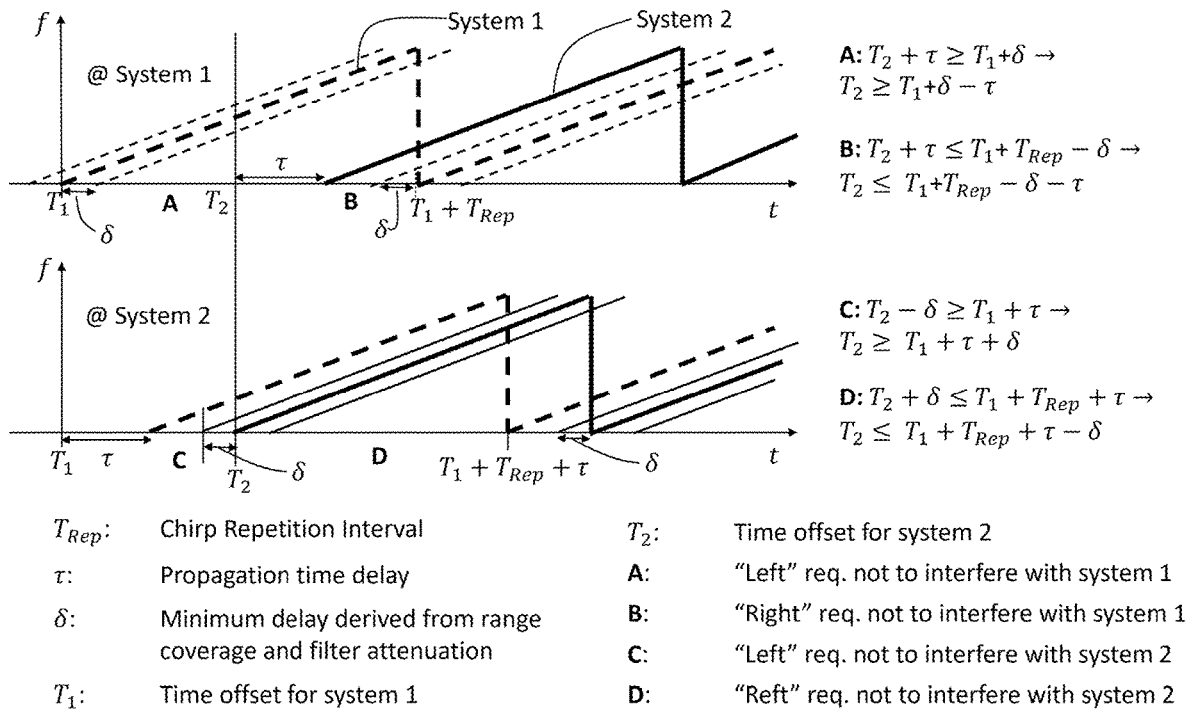
FIG. 10 is a simplified chart showing frequency sweeps for two different radars.

In particular, FIG. 10 illustrates an individual determination of time offsets for a particular subgroup, such as for the first 121 or second 122 groups.

For reasons of simplicity, the description here will start by considering the special case of two FMCW Doppler radars 120 and hence the number of previously isolated FMCW Doppler radars 120 in the current sub-group is one, $n_{is}=1$. The requirements for the general case of $n_{is}>1$ is simply that the requirements derived below must hold for all of the $n_{is}$ previously isolated FMCW Doppler radars 120. That case will be dealt with below.

Assume that FMCW Doppler radar 120 with number 1 has been allocated a time-offset $T_1$ (it is said to be isolated). Then, the constraints are sought pertaining to the time offset $T_2$ of FMCW Doppler radar 120 number 2 and how to select $T_2$. Firstly, $T_2$ must be chosen so that neither FMCW Doppler radar 120 number 1 nor FMCW Doppler radar 120 number 2 experiences any interference.

Four constraints A, B, C and D can be stated as illustrated in FIG. 10. The upper part of FIG. 10 depicts the relative timing of the waveforms for FMCW Doppler radar 120 number 1 ("System 1") and FMCW Doppler radar 120 number 2 ("System 2") at the location of FMCW Doppler radar 120 number 1 (for an arbitrary propagation time delay $\tau$ and time offset $T_2$ for FMCW Doppler radar 120 number 2). Similarly, the lower part of FIG. 10 depicts the relative timing of the waveforms for FMCW Doppler radar 120 number 1 and FMCW Doppler radar 120 number 2 at the location of FMCW Doppler radar 120 number 2 (for an arbitrary propagation time delay $\tau$ and time offset $T_2$ for FMCW Doppler radar 120 number 2).

The sweep sequence illustrated with a thick dashed line belongs to FMCW Doppler radar 120 number 1 and the sweep sequence illustrated with a thick solid line belongs to FMCW Doppler radar 120 number 2. The thinner lines in the same style as the thicker sweep lines represent the "minimum separation constraints" with respect to IF frequency, i.e., a sweep from another FMCW Doppler radar 120 must not come closer than any of the thinner lines.

Now, denote the minimum IF frequency separation by $\Delta f_{min}$; being determined in such a way that the receiver radar 120 filter chain 206, 206' has a specified attenuation at $\Delta f_{min}$. Here, it is hence assumed identical FMCW Doppler radars 120 with identical filter chains 206, 206', even though it is straight-forward to allow for different receiver filter chains 206, 206' with different cut-off frequencies corresponding to that the radars 120 have different range intervals that are sought for target objects 10. Also, the waveforms are assumed to be matched (except for time and carrier frequency offsets).

The relation between the nominal minimum time offset $\delta$ and the minimum IF frequency separation $\Delta f_{min}$ is $$\delta = \frac{\Delta f_{min}}{\mu} \tag{10}$$

where $\mu$ is the chirp rate.

Constraints A and B stated in the upper part of FIG. 10 relate to the requirement that FMCW Doppler radar 120 number 2 shall not interfere with the already isolated FMCW Doppler radar 120 number 1. Constraint A is referred to as the "left side constraint" and constraint B is referred to as the "right side constraint". Constraint A states that $T_2$ must be chosen large enough to avoid causing interference to FMCW Doppler radar 120 number 1. Constraint B states that $T_2$ mustn't be chosen too large, because then the chirp of FMCW Doppler radar 120 number 2 will approach the next chirp of FMCW Doppler radar 120 number 1 and cause interference to FMCW Doppler radar 120 number 1.

Constraints C and D stated in the lower part of FIG. 10 relate to the requirement that FMCW Doppler radar 120 number 1 shall not interfere with FMCW Doppler radar 120 number 2. Constraint C is referred to as the "left side constraint" and constraint D is referred to as the "right side constraint". The constraints C and D are analogous to constraints A and B but from FMCW Doppler radar 120 number 2:s perspective (FMCW Doppler radar 120 number 2 must not experience interference from FMCW Doppler radar 120 number 1).

The constraints are:

A: $T_2 \geq T_1 + \delta - \tau$

B: $T_2 \leq T_1 + T_{Rep} - \delta - \tau$

C: $T_2 \geq T_1 + \tau + \delta$

D: $T_2 \leq T_1 + T_{Rep} + \tau - \delta$ (11)

Considering the "$\geq$" constraints A and C together and the "$\leq$" constraints B and D together, the "hardest" of each pair is selected. Since τ is positive, the constraint C is harder than the constraint A. For the same reason, it can be seen that constraint B is harder than constraint D. So, the final constraints guaranteeing interference free operation between FMCW Doppler radar 120 number 1 and FMCW Doppler radar 120 number 2 are $$T_2 \geq T_1 + \tau + \delta$$

$$T_2 \leq T_1 + T_{Rep} - \delta - \tau \quad (12)$$

In the general case when there are several FMCW Doppler radars 120 that have already been isolated, $n_{is} \geq 1$, the constraints defined in (12) shall hold for all of the $n_{is}$ FMCW Doppler radars 120.

$\tau_i$, i=1, 2, ... $n_{is}$, are defined to be the propagation time delay between FMCW Doppler radar 120 number 2 (the FMCW Doppler radar 120 to determine the offset for) and the i:th FMCW Doppler radar 120 in the subset of previously isolated FMCW Doppler radars 120 (propagation time delays are symmetric also in the case of multipath) and denote by $T_i$ the time offset of the i:th isolated FMCW Doppler radar 120 (replacing the $T_1$ parameter in the equations above). The notation $T_2$ for time offset of the new FMCW Doppler radar 120 is kept. Moreover, $$T_{21} = \max_{i \in \{1, \dots n_{is}\}} (T_i + \tau_i + \delta) \quad (13)$$

$$T_{22} = \max_{i \in \{1, \dots n_{is}\}} (T_i + T_{Rep} - \delta - \tau_i)$$

So, as long as $T_2 \geq T_{21}$ and $T_2 \leq T_{22}$ operation will be interference-free. Note that in most practical applications, the propagation time delays xi and the minimum time off-set δ are much less than $T_{Rep}$. This implies that at the start of the procedure ($n_{is}=1$), $T_{21} \ll T_{22}$.

It is now possible to describe how to iteratively choose time-offsets. Hence, given $n_{is}$ isolated FMCW Doppler radars 120, check the condition $T_{21} \leq T_{22}$. If true, the time offset for the new FMCW Doppler radar 120 can be selected as $T_2 = T_{21}$ and guarantee interference-free operation. Otherwise, if $T_{21} > T_{22}$, the current FMCW Doppler radar 120 under consideration (corresponding to $T_2$) cannot be offset in time to operate without mutual interference to the FMCW Doppler radars 120 in the set $\{1, \dots, n_{is}\}$ If that is the case, that FMCW Doppler radar 120 is transferred to the pool of FMCW Doppler radars 120 that cannot be isolated with respect to the already isolated FMCW Doppler radars 120 in the current sub-group and removed from future iterations for the current sub-group. Such an FMCW Doppler radar 120 will eventually become a member of another sub-group.

Step 4: In this step, the procedure checks $\mathcal{M}$ is empty. If it is not, the procedure jumps to step 5, otherwise it jumps to step 8.

Step 5: In this step, a ranking is performed of the FMCW Doppler radars 120 in $\mathcal{M}$, based on the interference inflicted by an FMCW Doppler radar 120 in $\mathcal{M}$ on the rest of the FMCW Doppler radars 120 in $\mathcal{M}$. This is hence an "interference ranking" of the above-discussed type. For example, one could sum up the interference-to-noise ratios of the other FMCW Doppler radars 120 due to the interfering FMCW Doppler radar 120.

Step 6: The highest-ranked FMCW Doppler radar 120 in $\mathcal{M}$, below designated by index in, as determined by step 4, is given a time-offset as $T_{\tilde{m}} = T_{21\tilde{m}}$, in the way detailed above. This FMCW Doppler radar 120 has now received a time-offset of its own which is such that it can operate without being interfered by, or cause interference to, any FMCW Doppler radar 120 in the subgroup, $\mathcal{S}_i$. The FMCW Doppler radar 120 defined by index $\tilde{m}$ is therefore moved from the set $\mathcal{M}$ to the set $\mathcal{S}_i$ and $n_{is}$ is increased by one.

Step 7: In this step, it is checked if $\mathcal{M}$ is empty. If it is not, the procedure jumps to step 3 and repeats steps 3 to 6. Eventually, $\mathcal{M}$ will be empty and the procedure arrives at step 8.

Step 8: In this step, $\mathcal{S}_{Rem}$ is updated by setting $\mathcal{S}_{Rem} = \mathcal{S} \mathcal{S}_{Rem} \setminus \mathcal{S}_i$, i.e., the FMCW Doppler radars 120 in the sub-group $\mathcal{S}_i$ that have now been defined are removed from $\mathcal{S}_{Rem}$.

Step 9: In this step, it is checked if $\mathcal{S}_{Rem}$ is empty. If so, all FMCW Doppler radars 120 have been allocated to a respective sub-group and given a time-offset such that an FMCW Doppler radar 120 can operate without causing or experience interference to or from any other FMCW Doppler radar 120 in its sub-group. If this is the case, the procedure finishes (jumps to step 11), otherwise it moves to step 10.

Step 10: Here, the sub-group index i is increased by one (i=i+1). An interference ranking of the FMCW Doppler radars 120 in $\mathcal{S}_{Rem}$ is done and the rank one FMCW Doppler radar 120 is put as the first FMCW Doppler radar 120 (member) in the new sub-group i, $\mathcal{S}_i$ (which now contains only this single member). This FMCW Doppler radar 120 is allocated zero time offset. A new "intermediate set" $\mathcal{M}$ is defined by setting it equal to the set of remaining FMCW Doppler radars 120 $\mathcal{S}_{Rem}$ minus the determined rank 1 FMCW Doppler radar 120 in $\mathcal{S}_i$, i.e., $\mathcal{M} = \mathcal{S}_{Rem} \setminus \mathcal{S}_i$. The procedure then jumps to step 3 and repeats steps 3 to 9.

Step 11: This is the final state where all FMCW Doppler radars 120 have been allocated to a respective sub-group and given a time-offset such that an FMCW Doppler radar 120 can operate without causing or experience interference to or from any other FMCW Doppler radar 120 in its sub-group.

The reason for the repeated interference ranking performed in step 5 is that the ranking order amongst the remaining FMCW Doppler radars 120 typically changes when an FMCW Doppler radar 120 is removed from consideration (as it can be when it has been "isolated"). So, by redoing the interference ranking in each iteration of the isolation procedure, the "worst" FMCW Doppler radar 120 from an interference perspective is isolated, using the time-offsets in an effective way.

As is clear from the above, the mutual interference between FMCW Doppler radars 120 within a sub-group has now been mitigated by defining suitable time-offsets. However, there may be significant interference between sub-groups (such as the first group 121 and the second group 122) of FMCW Doppler radars 120. This can be mitigated as described below, by introducing a common change of the carrier frequency of each of the FMCW Doppler radars 120 in a subgroup with respect of the carrier frequencies of the other sub-groups. Preferably, these carrier frequency offsets are chosen so that the interference between sub-groups will be located at non-important velocity regions.

Figure 11:
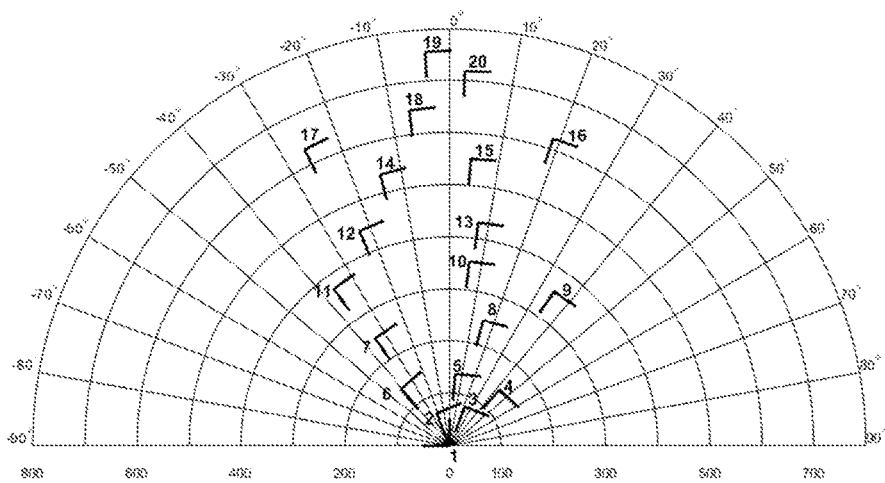
FIG. 11 is a top layout view of a number of co-located FMCW Doppler radars.

Before describing the selection of carrier frequency offset in more detail, however, an illustrating example of the sweep time offset selection is provided based on a layout of FMCW Doppler radars 120 as shown in FIG. 11. In this FIG. 11, a designated victim FMCW Doppler radar 120 (number 1) is located at (0,0). Nineteen interfering FMCW Doppler radars 120 are distributed across range and angle directions. The view in FIG. 11 is from above and the axes of the antenna coordinate systems are drawn at the locations of the individual FMCW Doppler radars 120.

Figure 12A:
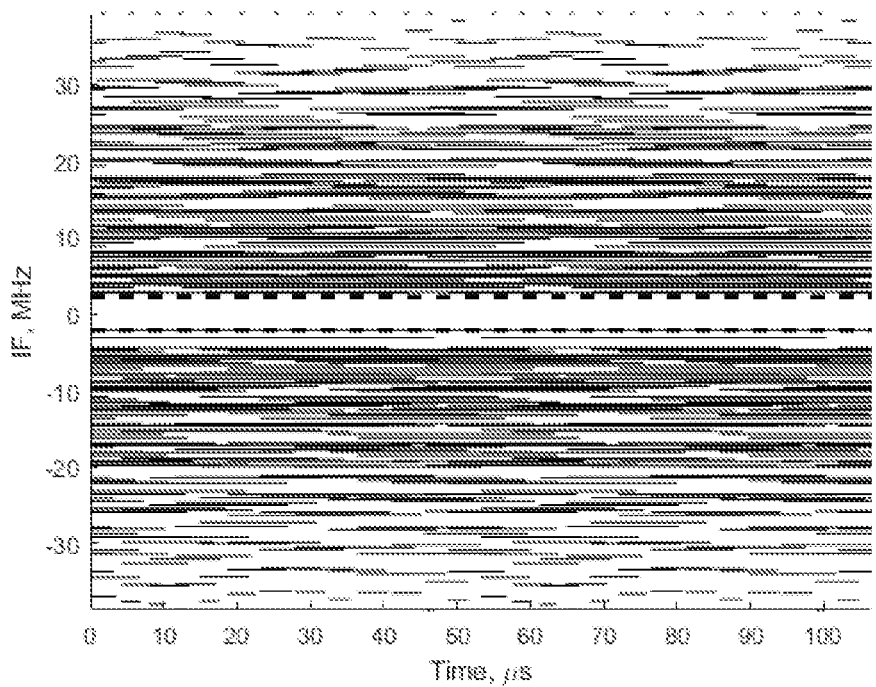
FIGS. 12a and 12b are respective plots of IF (Intermediate Frequencies) in relation to time for a first and second identified group, respectively, of the plurality of FMCW Doppler radars shown in FIG. 11.
Figure 13A:
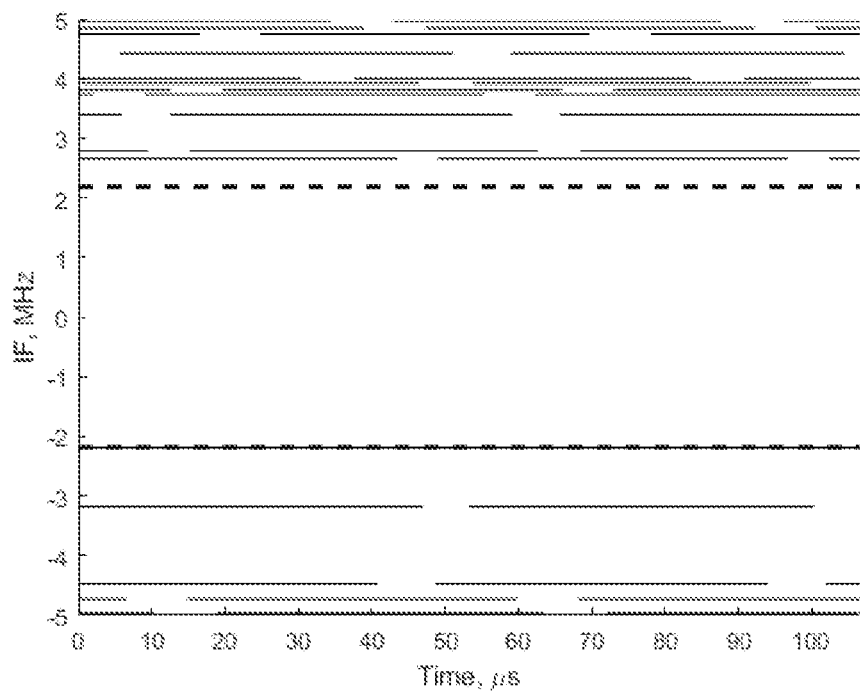
FIGS. 13a and 13b are respective magnified detail views of the plots shown in FIGS. 12a and 12b.

After performing the above-described procedure, the number of isolated FMCW Doppler radars 120 was thirteen (the first group 121). Furthermore, there were seven FMCW Doppler radars 120 (the second group 122) that did were allotted sweep time offsets in relation to each other but not to the first group 121. In FIG. 12a and FIG. 13a (zoomed version), the resulting IF frequencies are plotted for all pairs of isolated FMCW Doppler radars 120 belonging to the first group 121. Inspecting FIG. 13a, it is clear that the isolated FMCW Doppler radars 120 within the first group 121 do not interfere with each other, as will now be explained.

More particularly, FIGS. 12a (and 13a, zoomed in) shows all pairwise IF frequencies of said isolated FMCW Doppler radars 120 in the first group 121. The dashed horizontal lines near indicate the receiver bandwidth plus a margin determined so that all interfering IF components are damped at least 115 dB.

Figure 12B:
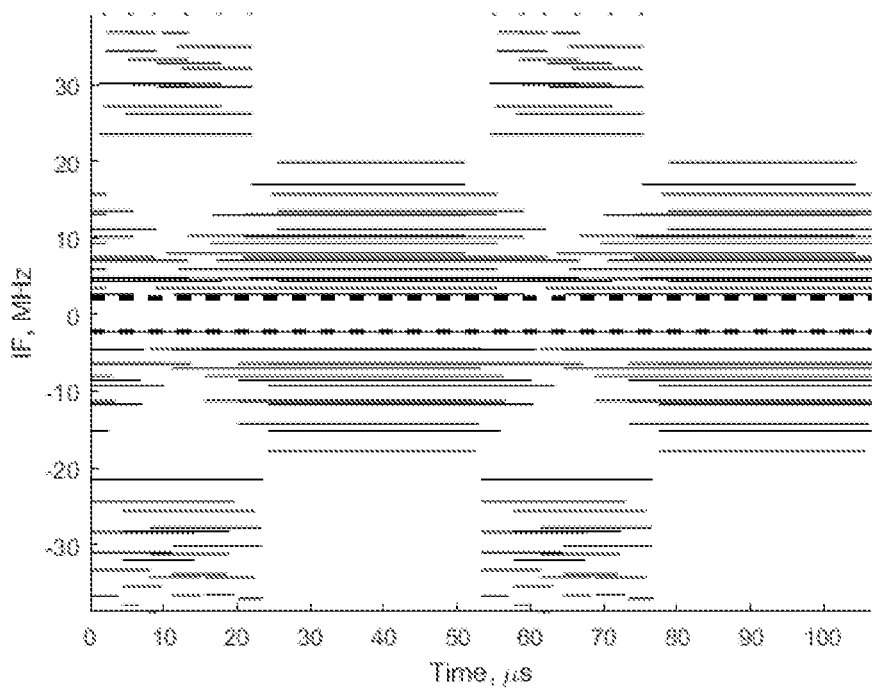
Figure 13B:
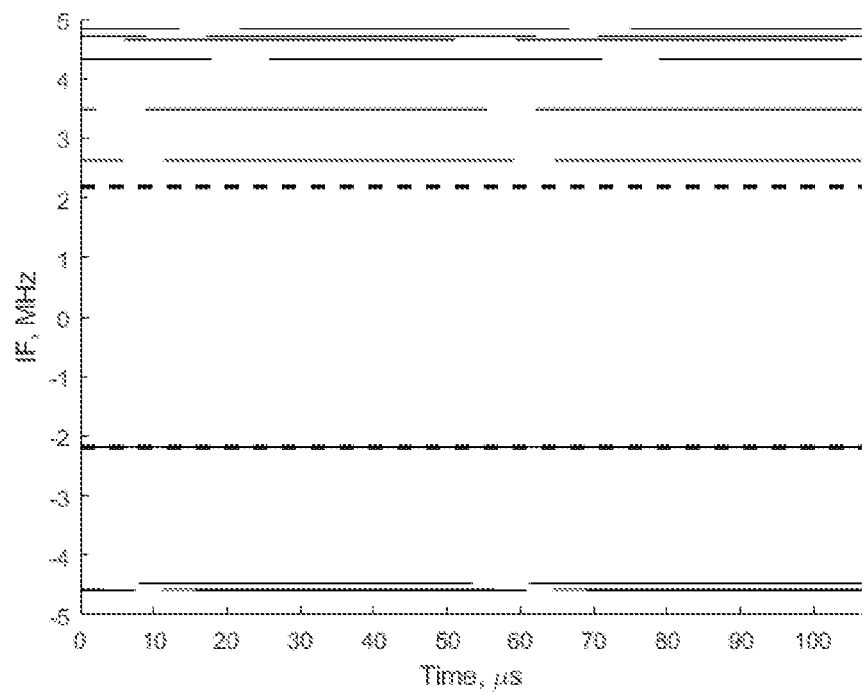

FIGS. 12b and 13b correspond to FIGS. 12a and 13a, but showing the situation for the second group 122.

To summarize some of the above, once the individual unique sweep time offsets have been determined for all possible FMCW Doppler radars 120 in the first ranking group, this group of isolated FMCW Doppler radars 120 hence becomes the "first group" 121 in the above-used terminology. At this point, the FMCW Doppler radars 120 in the second ranking group are considered, and if all FMCW Doppler radars 120 in this second ranking group are allotted individual group-unique sweep time offsets they then form the "second group" 122 in the above terminology. The allocation of all FMCW Doppler radars 120 into groups 121, 122 is then finished. However, in case there are still FMCW Doppler radars 120 at this point that have not been allocated into neither the first group 121 nor into the second group 122, the procedure continues to put together a third (and possibly subsequent) ranking group. Hence, the remaining FMCW Doppler radars 120 form the third ranking group, and the procedure iterates again, in the corresponding manner as described above. Each time it is determined that a certain maximum number of FMCW Doppler radars 120 of a currently considered ranking group can be allotted group-unique sweep time offsets, the FMCW Doppler radars 120 of that ranking group form the next group in the above terminology; and the procedure continues until all FMCW Doppler radars 120 of the system 100 have been assigned to a group.

Once said first and second groups 121, 122 (and any additional groups, as the case may be) are formed and all FMCW Doppler radars 120 have been associated with group-unique sweep time offsets, step S4 is finished.

However, as illustrated in FIG. 9, the sweep frequency offset synchronizing step S5 may take part in any time relation to step S4 (as is, in fact the case for steps S3, S4 and S5. Hence, step S5 may be performed before or in parallel to step S4, or after the finalization of step S4. It may also be the case that a predetermined set of frequency offsets are used for the various groups 121, 122 identified in step S4, so that the synchronizing of sweep frequency offsets in step S5 is only an association of each of said identified groups 121, 122 to a respective unique sweep frequency offset from said predetermined set of sweep frequency offsets.

In order to avoid the risk of strong localized interference inside the interesting target object 10 distance intervals of the first group 121 of FMCW Doppler radars 120 (the interference in question being located at low velocities when carrier frequencies are nominally the same), the carrier frequencies (sweep center frequencies) of the second group 122 of FMCW Doppler radars 120 may be adjusted (decreased or increased), so as to locate interference to velocity regions that do not affect the capability of the system 100 to accurately detect and track target objects 10. It is understood that such velocity regions may vary across different practical embodiments. In the particular case that the target objects 10 are golf balls, interference may be localized (by selecting an appropriate sweep frequency offset across groups 121, 122) to detected velocities below 0 m/s, or even below −35 m/s; and/or above at least 80 m/s, or even above at least 100 m/s.

In the special case of only two groups 121, 122, the carrier/center frequency can be increases (or decreased) of the second group 122 in relation to the first group 121 by half the chirp-repetition frequency. In this way, the interference experienced by FMCW Doppler radars 120 in the first group 121 are moved up to the lowest (or highest) unambiguous velocities, which in many embodiments does not produce any detrimental interference. More specifically, to move the interference generated by the second group 122 in the first group 121 to the lowest unambiguous velocity component (on the negative side), the common carrier frequency of FMCW Doppler radars 120 in the second group 122 are frequency shifted by an amount $\Delta_{HF}=0.5/T_{Rep}$ (choosing a positive shift). This carrier frequency shift will be interpreted as a (positive) Doppler shift in the radar processing, which will be mapped to a negative velocity (as explained above). Note that, by symmetry, the interference from the first group 121 on the second group 122 will be located at corresponding positive velocity intervals.

In other embodiments, the carrier frequency selection can be done to guide interference to arbitrary velocity values, by introducing sweep frequency shifts of corresponding magnitudes.

Generally, offsetting the velocity of misreads across different groups 121, 122, using sweep frequency offsets as described above, may not only be located (by corresponding selection of sweep frequency offsets) in unproblematic object 10 tracking velocity intervals, so that false object 10 detection does not occur. Such velocity shifting can also increase the sensitivity for tracking actual object 10 in velocity intervals close to or including velocity-producing interference in the non-frequency shifted case.

Hence, a respective sweep frequency offset may be selected, for one or several, such as each, of said groups 121, 122, to be sufficiently large so that interference between FMCW Doppler radars 120 belonging to said first group 121 and FMCW Doppler radars 120 belonging to said second group 122 result in tracked object 10 velocity misreads or detection sensitivity deterioration that are outside of a predetermined velocity range. In particular, the sweep frequency offset may be selected as between 0.3 and 0.7 times, such as between 0.4 and 0.6 times, such as about or exactly 0.5 times, a sweep repetition frequency used by said plurality of FMCW Doppler radars 120.

It is understood that such sweep frequency shifts may be introduced with respect to all identified groups 121, 122, and so forth, even in case there are three or more such groups of FMCW Doppler radars 120 in the system 100 identified according to the methodologies described herein. The first group 121 may be allotted "zero" sweep frequency shift while the other groups (the second 122 and any subsequent groups) may be allotted various unique non-zero sweep frequency shifts. What is important is that no two such groups 121, 122 have the same relative sweep frequency shift, but that all such groups 121, 122 of FMCW Doppler radars 120 are associated with respective sweep frequency shifts making inter-group interference appear at target objects 10 that are non-problematic for the application in question.

After said synchronization steps S3, S4, S5, in a subsequent target object 10 detection step the system 100 may use several of said plurality of FMCW Doppler radars 120 of the system 100 to measure a respective location and velocity, relative to a respective measuring FMCW radar 120, of one or several moving target objects 10. This measurement may take place in a per se conventional manner, by some or each of said FMCW Doppler radars 120 repeatedly emitting FMCW sweeps using said selected respective sweep time offset and said selected respective sweep frequency offset.

As mentioned above, the plurality of FMCW Doppler radars 120 may comprise one or several FMCW Doppler radars 120 capable of detecting a direction to a detected target object 10, such as using more than one receive radar antenna 202. In some embodiments, several different FMCW Doppler radars 120 detect or track one and the same target object 10 simultaneously, but from different angles.

As was also mentioned above, a respective sweep waveshape used by each of said FMCW Doppler radars 120 may be identical across said FMCW Doppler radars 120, apart from said respective sweep time offset and sweep frequency offset used by the FMCW Doppler radar 120 in question. Hence, waveforms used by all FMCW Doppler radars 120 may be identical linear FMCW waveforms that may have the same chirp rates and/or the same durations and/or the same bandwidths.

As is illustrated in FIG. 9, the propagation determination step S2, the sweep time offset synchronizing step S4 and the sweep frequency offset step S5 may be performed repeatedly, such as periodically and/or when adding an additional FMCW Doppler radar 120 to the system 100 or when making any other configuration or topology updates or changes to the system 100. The clock synchronization step S3 may also be performed repeatedly/intermittently.

For instance, FMCW Doppler radars 120 are usually deployed and connected to a network one at a time. When an FMCW Doppler radar 120 is activated and has locked onto the common time reference source, it may be arranged to await a que message, such as from the central control module 110 or from an installing user via a user interface of the radar 120 in question, to either engage its TX function using some special-purpose waveform (the test signal waveform, above) or to listen to the test signal transmission of another cooperating FMCW Doppler radar 120. In other words, this que message then defines the start of the above-described synchronization steps S3, S4, S5, that may then involve several or even all the FMCW Doppler radars 120 already present in the system 100.

The synchronization steps S3, S4, S5 may also, or instead, be performed on a regular time basis, with the purpose to assess the mutual interference in the system 100 and the propagation time delays between the FMCW Doppler radars 120, and to take appropriate action as exemplified above. The synchronization steps S3, S4, S5 may also be performed when so is required, either based on an automatic detection of a change in some parameter value affecting operation prerequisites, or manually trigger by a user of the system 100.

In the following, an example is presented, in connection to FIGS. 14-17, showing how the range-velocity response may look fora victim radar 120 without coordinating of the FMCW Doppler radars 120 of the system 100, and how it may look if coordination is instead applied using the procedure described above.

The scenario shown in FIG. 11 is used. As described above, it contains twenty FMCW Doppler radars 120, of which one is designated as the "victim radar" (the radar at the origin). It is for this radar that the interference experience will now be shown in the range-velocity domain. The data of the present example is derived from a simulation of a simplified system 100, for reasons of clarity and simplicity.

The maximum distance (range) to an interfering FMCW Doppler radar is 756 m. For a matched waveform case and assuming zero time offset, the IF frequency will generate a point response at half this distance in the signal processing, i.e., at about 378 m. The receiver bandwidth of the victim radar (and all radars for that matter) is such that the corresponding −3 dB range is 304 m. In view of this, it is noted that if all radars would use zero time offset for their chirp sequences, the radars at ranges farther out than about 610 m would be increasingly attenuated by the filters in the receiver chain of the victim. There are fourteen interfering radars with range less than 610 m (excluding the victim). Furthermore, the range corresponding to an IF value where an attenuation of 115 dB is present (assuming two-way propagation) is 400 m, which converts to 800 m for one-way propagation (for interference). So, there are fourteen radars within the "−3 dB range" but all radars are within the "−115 dB range" interval. The 19−15=4 radars lying in the "transition band" (from 610 to 800 m) will be attenuated to varying degrees depending on their actual IF frequencies and the detailed characteristics of the transfer function of the receiver. In this discussion, the effect of free space attenuation is ignored, so radars at far range in real life would have an additional significant relative damping. Otherwise, the radars are identical with respect to the output power, antenna gains etc., and all interferers are pointing head on to the victim radar.

Furthermore, in these simulations thermal noise was added in the victim radar. The interference-to-noise ratio generated by the interfering radars was accurately modelled with the radar equation, including antenna gains on transmit and receive, different losses and so forth.

First looking at the uncoordinated case, all sweep time offsets were set to zero. This means that the main factor affecting the resulting IF frequencies is the propagation time delays.

Furthermore, for this uncoordinated case, the FMCW Doppler radars 120 do not have a common time reference to lock on to. This means that the clocks/oscillators of the FMCW Doppler radars 120 will have a significant drift relative to each other. Therefore, waveforms were somewhat dissimilar (although their nominal specifications were the same), so some smearing resulted. Both IF frequency and "Doppler" varied with time, since oscillators were running at different speeds. The relative clock drifts for this simulation were randomized (uniform distribution) in the interval −25 ppm to 25 ppm (x ppm means that the clock changes x microseconds per second). The drift was assumed constant over the 20 ms coherent integration time.

Figure 14:
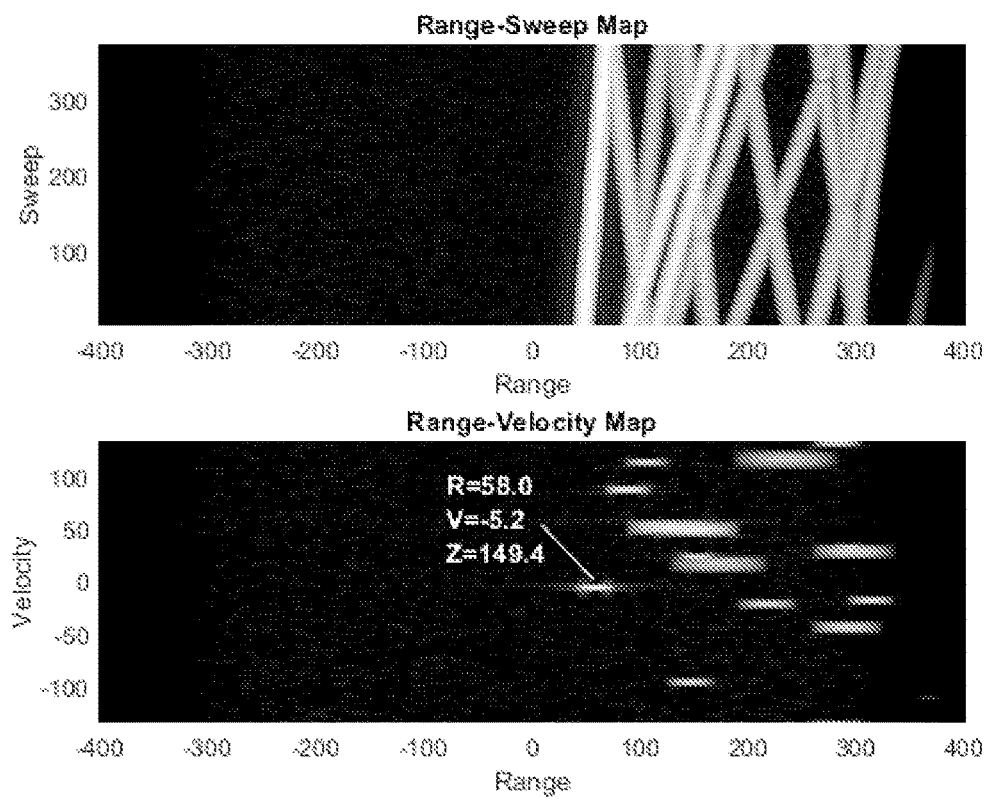
FIGS. 14,15 and 16 are respective combinations of a range-sweep map (upper respective part) and a range-velocity map (lower respective part) for three different scenarios.

The result for this case is shown in FIG. 14, the lower part showing the range-velocity map for the victim FMCW Doppler radar 120 for the above-described uncoordinated case. About fourteen significant interference components are counted for this case; the label designates the one with highest power. Notice also the relatively large defocusing of the interference response although nominal waveform parameters are matched; this is due to large relative clock drifts.

An additional problem with a system 100 having FMCW Doppler radars 120 associated with individual drift is that this typically will increase the risk of false detected trajectories of target objects 10. This is since detections due to the interferer will then be produced regularly over time, and in particular when time offsets and propagation time delays are such that the IF components are in the interesting range interval for target object 10 detection. The detections will change in range and (slightly) in velocity; a tracker may then erroneously detect such information as target object 10 trajectories due to the interference.

Now the results when applying a synchronization procedure of the above-described type, will be investigated, for the same system.

The FMCW Doppler radars 120 now have locked on to a common time reference and the relative clock drifts are very small between the FMCW Doppler radars 120. Relative clock drifts of 0.05 ppm were used in this part of the simulation, randomized using a uniform distribution in the interval −0.05 ppm to 0.05 ppm. For reference, the procedure illustrated in FIG. 20 was used, and automatically determined the two groups 121, 122 as:
First group=[1 13 7 10 8 15 2 17 9 6 18 5 4].
Second group=[3 14 19 20 11 16 12].

Figure 15:
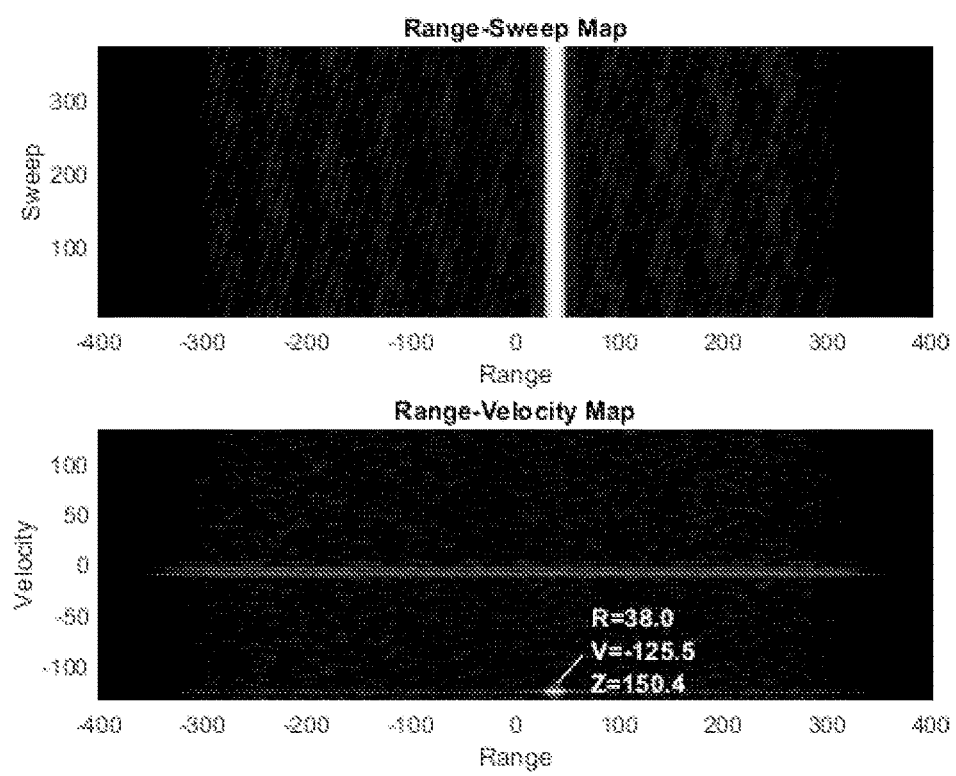

The result is shown in FIG. 15, showing the range-sweep and range-velocity maps for the victim radar for this coordinated case.

Hence, it can be seen that the approach for coexistence works as intended. The interferers of the first group 121 (there were in total thirteen FMCW Doppler radars 120 that could be isolated in the first step including the victim radar) have been put outside the interesting range interval. Furthermore, the interferers of the second group 122 of seven radars got a small carrier frequency shift upwards corresponding to 0.45 PRF (not the above-mentioned value of 0.5 PRF, in order to make this effect more visible in the plot). This carrier frequency shift results in a velocity shift of −120.9 m/s v=−$\lambda f_D$/2 if the clock drifts are zero. However, clock drifts are not exactly zero and the change in velocity will not be exact; it will however be sufficiently good for the present purposes, namely to move the interference sufficiently far away from small velocities.

Figure 17:
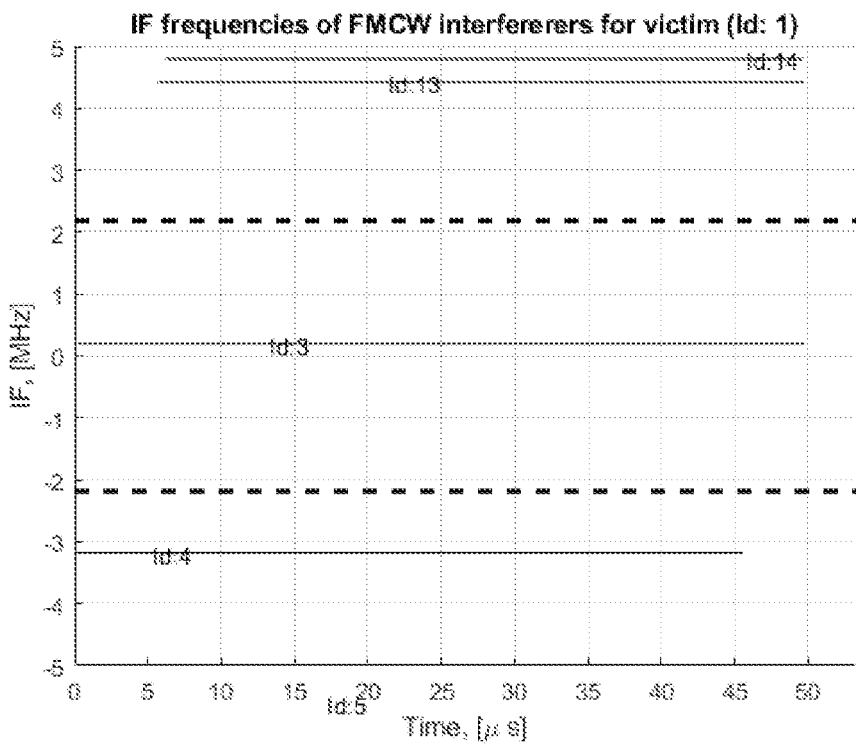
FIG. 17 is a plot of IF in relation to time for the scenario illustrated in FIG. 15.

From FIG. 17, illustrating the relative IF frequencies experienced by the victim radar 120 (zoomed in), it can be seen that it is radar number 3 from the second group 122 (as expected) that generates the sharp point response labelled in FIG. 15 (it generates an IF frequency inside the passband of the victim receiver). Radar number 3 is a member of the second group 122. By chance, the other radars from the second group 122 displayed a total relative delay such that the corresponding IF frequencies were in the stop band of the victim receiver. In FIG. 17, the dashed lines in the figure indicate the frequencies where the victim receiver chain 206, 206' has an attenuation of 115 dB.

Inspecting FIG. 15 (using "hard blanking" but not "soft blanking", see below), there is some residual interference (ridges) at low velocities. This is due to short transients generated by the down sweeps of the interfering radars. These transients are "broadband" and have elevated spectral content far from the "main IF frequency" and part of it will leak into the receiver passband of the victim radar. This phenomenon will be discussed in more detail below, together with some means for reducing this.

Figure 16:
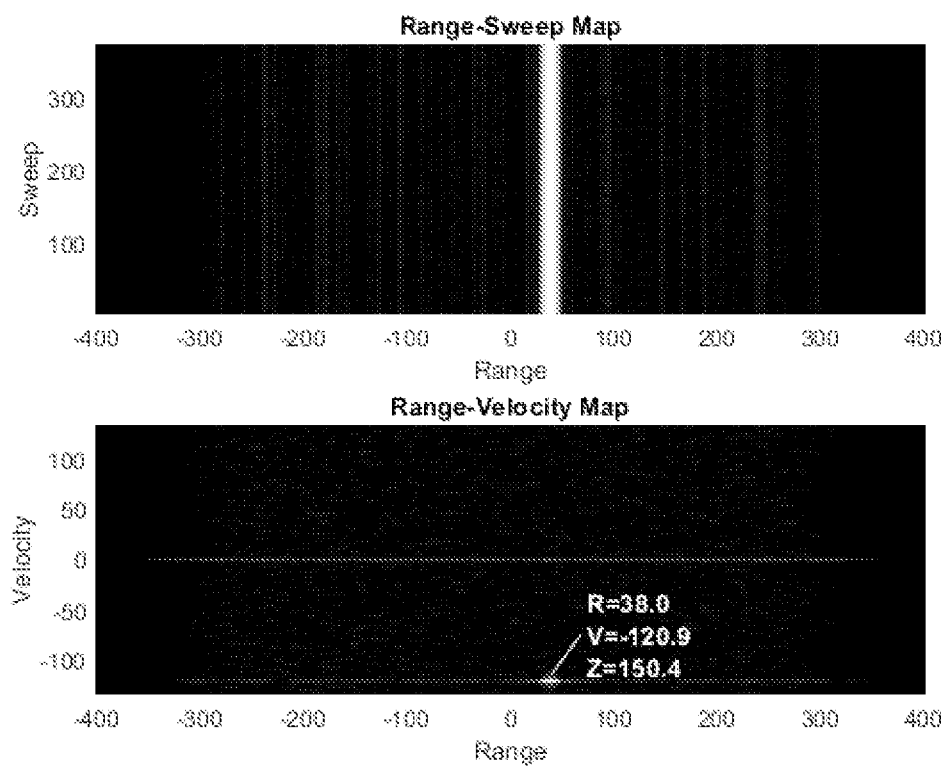

Just for verification, the same case was simulated without clock drifts in FIG. 16, showing range-sweep and range-velocity maps. The label in the lower part of FIG. 16 shows that the interference component is moved exactly the velocity −120.9 m/s, as was predicted for perfectly synchronized clocks.

As described above, it is proposed to use deliberate delays of the transmitted chirps to separate the FMCW Doppler radars 120 in the range dimension. However, the short periods of down-chirps will generate short transients at the output of the mixers in the victim FMCW Doppler radars 120. These transients are "broadband" and have elevated spectral content far from the "main IF frequency". These spectral components will to a varying degree leak into the passband of the victim receiver and generate excess noise along ridges in the distance (range) domain. Such ridges of interference can be identified in, for example, FIG. 15 at low velocities. If these ridges had been located at exactly zero velocity, it would have been a minor problem since normally a clutter filter is applied as a part of the radar signal processing, filtering out zero velocity. However, due to some residual oscillator drift, these ridges will "move about" in some small velocity interval around zero velocity where good sensitivity is normally desired for target object detection.

Such interference can be reduced using a combination of blanking of the return ramps (such as down chirps of a regular sawtooth pattern or up chirps for an inverted sawtooth pattern) and tapering, making the transients "softer" to reduce the magnitude of the high spectral content of the transients. That principle can be applied both to the transmitted signal and to the mixer signal. However, with respect to mitigation of the said high spectral content of the transients, it is the application or this principle to the transmitted signals that is important.

As used herein, the term "blanking" means to decrease or completely switch off transmission power during a return ramp of a frequency pattern. By "hard blanking" is meant a tapering function which is the value 1 during the up-chirp and the value 0 during the down-chirp (completely switched off transmission power). By "soft blanking" is meant a modification of the hard blanking such that it has a smoother shape. Soft blanking will affect the range resolution of the regular radar function, since the transmitted bandwidth is reduced, and reduce the peak of the target response somewhat; the reduction of the peak response is referred to as tapering loss. Furthermore, it typically reduces to transmitted energy which causes a further SNR (Signal-to-Noise Ratio) reduction.

In general, the above-discussed FMCW sweeps may comprise respective return ramp waveforms, said return ramp waveforms then being hard blanked or smoothed.

Figure 18:
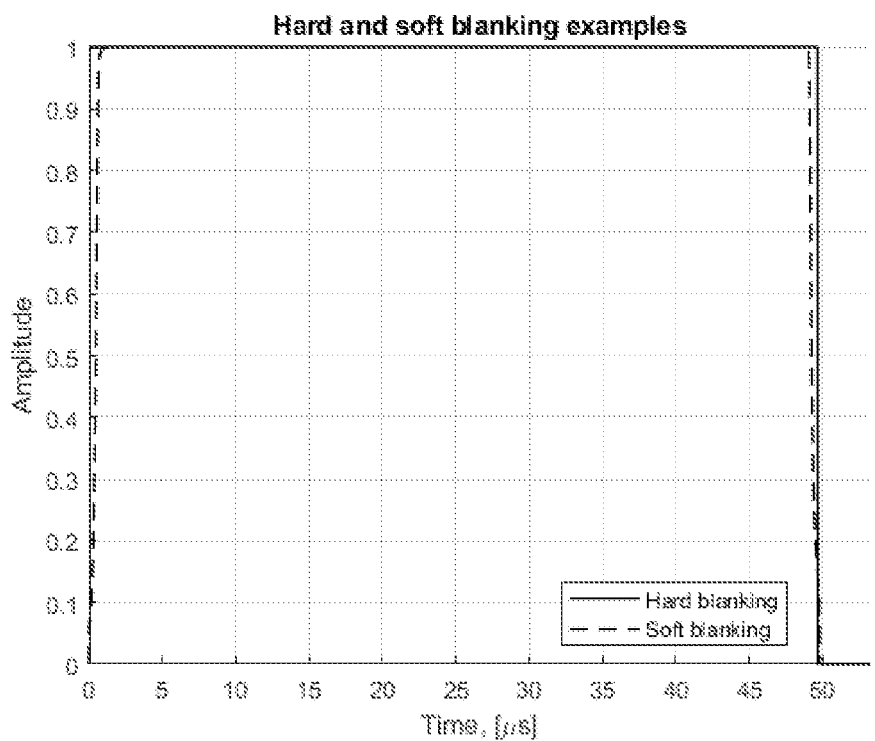
FIG. 18 is a chart illustrating the shape of a soft blanking and a hard blanking, respectively, as a function of time.

Examples of hard and soft blanking functions are shown in FIG. 18, showing an example of "Hard" and an example of "Soft" blanking. The down chirp (return ramp) starts at t=51.1 μs and ends at the chirp repetition interval, t=53.3 μs. One interesting point is how "soft" or "smooth" to make the soft blanking. On the one hand, the softer the blanking the smaller the experienced interference. On the other hand, range resolution is reduced. If the radars are equipped with digital synthesis of the TX waveforms and high performance flexible linearly tunable amplifiers, almost arbitrary tapering functions can be designed. The design in FIG. 18, however, shows a relatively simple solution with only limited flexibility in terms of design parameters. The design of the soft tapering on TX for that radar involved a careful selection of the values of an RC-constant of an electric circuit. So, completely symmetric tapering functions could not be designed, and this soft blanking was a compromise based on investigating the spectral properties of the soft blanking (symmetry etc).

The cases of no blanking, hard blanking and soft blanking were compared for a simple two-radar scenario using the hard and soft banking functions illustrated in FIG. 18. Stepping the time-offset of the interferer from zero to the chirp repetition interval relative the victim sweep time offset, the maximum interference level for each case was observed (within the interesting target range interval which is about 300 m as before). The results were:

No blanking: −45.3 dB
Hard blanking: −71.9 dB
Soft blanking: −77.4 dB

Hard blanking reduced interference by 26.6 dB and soft blanking made a further improvement over hard blanking by 5.5 dB. Hence, soft blanking reduced interference by 32.1 dB. The bandwidth reduction suffered from using soft blanking was 1.71%, which implies that the width of a point target response increased by 1.74% as compared to hard blanking.

Throughout the examples shown in the various Figures in the present application, hard blanking was generally used.

Above, preferred embodiments have been described. However, it is apparent to the skilled person that many modifications can be made to the disclosed embodiments without departing from the basic idea of the invention.

For instance, the system 100 may comprise many additional parts for detecting and tracking target objects 10, such as more pieces of radar equipment and various computer systems arranged to process object 10 tracking data, such as to determine object track feasibility and 3D trajectories in real-time.

Hence, the invention is not limited to the described embodiments, but can be varied within the scope of the enclosed claims.

What is claimed is:

1. A method for providing reduced interference for at least two co-located and cooperative FMCW (Frequency Modulated Continuous Wave) Doppler radars operating in a coordinated manner, each of the FMCW Doppler radars being used in a system to detect respective distances to and velocities of objects moving through space in relation to each of the FMCW Doppler radars, the method comprising
   determining expected electromagnetic wave propagation times between pairs of the FMCW Doppler radars;
   selecting different respective sweep time offsets with respect to each FMCW Doppler radar in a first group of the FMCW Doppler radars;
   selecting a second non-zero sweep frequency offset with respect to a second group of the FMCW Doppler radars, the second sweep frequency offset being relative to a sweep frequency pattern used for FMCW Doppler radars belonging to the first group; and
   selecting different respective sweep time offsets with respect to each FMCW Doppler radar in the second group of the FMCW Doppler radars;
   wherein the selecting of different respective sweep time offsets comprises
   in a first ranking, ranking FMCW Doppler radars in a first ranking group of FMCW Doppler radars, the first ranking being performed according to interference severity in relation to the other FMCW Doppler radars of the first ranking group, the first ranking further being based on the expected electromagnetic wave propagation times; and
   for each of the FMCW Doppler radars in the first ranking group, in order from a most severely interfering one of the FMCW Doppler radars to less severely interfering ones of the FMCW Doppler radars, selecting a respective first sweep time offset for the FMCW Doppler radar, taking into consideration both a determined minimum relative sweep time offset and a propagation time delay of the FMCW Doppler radar in relation to other FMCW Doppler radars in the first ranking group for which a respective first sweep time offset has already been selected.

2. The method according to claim 1, further comprising the system using several of the FMCW Doppler radars to measure a respective location and velocity, relative to a respective measuring FMCW Doppler radar, of one or several moving objects, by each of the FMCW Doppler radars repeatedly emitting FMCW sweeps using the selected respective sweep time offset and, in applicable cases, the selected respective sweep frequency offset.

3. The method according to claim 2, wherein
the FMCW sweeps comprise respective return ramp waveforms, and wherein
the return ramp waveforms are blanked.

4. The method according to claim 1, further comprising repeating the determining of expected electromagnetic wave propagation times; the selecting of different respective sweep time offsets; and the selecting of a second non-zero sweep frequency offset, the repeating being performed periodically and/or when adding an additional FMCW Doppler radar to the system.

5. The method according to claim 1, further comprising synchronizing a respective clock of each of the FMCW Doppler radars, such as based on a common received geolocation signal or a common received time signal from a central control module of the system, the clock then being used in combination with the respective sweep time offset to trigger an FMCW sweep.

6. The method according to claim 1, wherein
the determining of expected electromagnetic wave propagation times comprises one or several of the FMCW Doppler radars emitting a respective electromagnetic test signal, the electromagnetic test signal being detected and timed by one or several of the other FMCW Doppler radars.

7. The method according to claim 6, wherein
the determining of expected electromagnetic wave propagation times comprises each FMCW Doppler radar receiving the electromagnetic test signal and determining a maximum detected propagation time of the electromagnetic test signal, taking into consideration any multi-path wave trajectories, the received electromagnetic test signal having at least a predetermined minimum power at reception.

8. The method according to claim 7, wherein
the electromagnetic test signal is an FMCW wave.

9. The method according to claim 7, wherein
the electromagnetic test signal is emitted from each emitting FMCW Doppler radar having a carrier frequency that is offset in relation to a carrier frequency used for respective electromagnetic test signals by each of the other FMCW Doppler radars.

10. The method according to claim 9, wherein
the determining of expected electromagnetic wave propagation times comprises measuring, at each FMCW Doppler radar receiving the electromagnetic test signal, a maximum power of the received electromagnetic test signal.

11. The method according to claim 1, wherein
a respective sweep waveshape used by each of the FMCW Doppler radars is identical across the FMCW Doppler radars, apart from the respective sweep time offset and sweep frequency offset used by the FMCW Doppler radar.

12. The method according to claim 1, wherein the selecting of different respective sweep time offsets further comprises identifying a second ranking group of one or several FMCW Doppler radars in the first ranking group for which it is determined that it is not possible to select a respective sweep time offset that does not result in a predetermined minimum level of interference during object tracking operation;

in a second ranking, ranking FMCW Doppler radars in the second ranking group of FMCW Doppler radars, the second ranking being performed according to interference severity in relation to the other FMCW Doppler radars of the second ranking group, the second ranking further being based on the expected electromagnetic wave propagation times;

for each of the FMCW Doppler radars in the second ranking group, in order from a most severely interfering one of the FMCW Doppler radars to less severely interfering ones of the FMCW Doppler radars, selecting a respective second sweep time offset for the FMCW Doppler radar, taking into consideration both the determined minimum relative sweep time offset and a propagation time delay of the FMCW Doppler radar in relation to other FMCW Doppler radars in the second ranking group for which a respective second sweep time offset has already been selected;

selecting as the first group of FMCW Doppler radars the FMCW Doppler radars belonging to the first ranking group but not to the second ranking group; and selecting as the second group of FMCW Doppler radars one or several FMCW Doppler radars belonging to the second ranking group.

13. The method according to claim 12, wherein the selecting of different respective sweep time offsets further comprises determining the minimum relative sweep time offset based on a minimum sweep time offset producing at least a predetermined attenuation of an IF (Intermediate Frequency) of one of the FMCW Doppler radars experiencing interference from another one of the FMCW Doppler radars.

14. The method according to claim 1, wherein the sweep frequency offset is selected so that interference between FMCW Doppler radars belonging to the first group and FMCW Doppler radars belonging to the second group result in object velocity misreads that are outside of a predetermined velocity range, such misreads corresponding to false object detection due to the interference.

15. A method for providing reduced interference for at least two co-located and cooperative FMCW (Frequency Modulated Continuous Wave) Doppler radars operating in a coordinated manner, each of the FMCW Doppler radars being used in a system to detect respective distances to and velocities of objects moving through space in relation to each of the FMCW Doppler radars, the method comprising determining expected electromagnetic wave propagation times between pairs of the FMCW Doppler radars;

selecting different respective sweep time offsets with respect to each FMCW Doppler radar in a first group of the FMCW Doppler radars;

selecting a second non-zero sweep frequency offset with respect to a second group of the FMCW Doppler radars, the second sweep frequency offset being relative to a sweep frequency pattern used for FMCW Doppler radars belonging to the first group; and selecting different respective sweep time offsets with respect to each FMCW Doppler radar in the second group of the FMCW Doppler radars;

wherein the sweep frequency offset is selected so that interference between FMCW Doppler radars belonging to the first group and FMCW Doppler radars belonging to the second group result in object velocity misreads that are outside of a predetermined velocity range, such misreads corresponding to false object detection due to the interference; and wherein the sweep frequency offset is selected as between 0.3 and 0.7 times a sweep repetition frequency used by the FMCW Doppler radars.

* * * * *